United States Patent [19]

Fukuoka

[11] 3,952,358

[45] Apr. 27, 1976

[54] SHOE AND A METHOD FOR MANUFACTURING THE SAME

[76] Inventor: Tatsuo Fukuoka, No. 3, 3-Ban, 2-Chome, Shin-Minami-Fukushima, Tokushima, Japan

[22] Filed: Oct. 2, 1974

[21] Appl. No.: 511,243

Related U.S. Application Data

[63] Continuation-in-part of Ser. No. 402,967, Oct. 3, 1973, abandoned.

[30] Foreign Application Priority Data

Nov. 2, 1973 Japan.......................... 48-127548[U]
Jan. 18, 1974 Japan............................ 49-8507[U]
May 4, 1974 Japan.......................... 49-51055[U]

[52] U.S. Cl. ........................................... 12/142 MC
[51] Int. Cl.² ............................................ A43D 9/00
[58] Field of Search......... 12/142 R, 142 RS, 142 S, 12/146 B, 146 C, 142 MC; 36/11.5, 2.5 R

[56] References Cited

UNITED STATES PATENTS

| 3,552,039 | 1/1971 | Fukuoka | 36/11.5 |
| 3,672,078 | 6/1972 | Fukuoka | 36/11.5 |
| 3,698,107 | 10/1972 | Fukuoka | 36/11.5 |

*Primary Examiner*—Patrick D. Lawson

[57] ABSTRACT

A method for manufacturing a shoe, comprising a first step for three-dimensionally molding a lateral side section of thermosetting or thermoplastic resinous material, a second step for connecting an upper vamp section integrally or separately with said lateral side section and a third step for connecting a sole integrally or separately with the lateral side section, and a shoe manufactured thereby.

1 Claim, 68 Drawing Figures

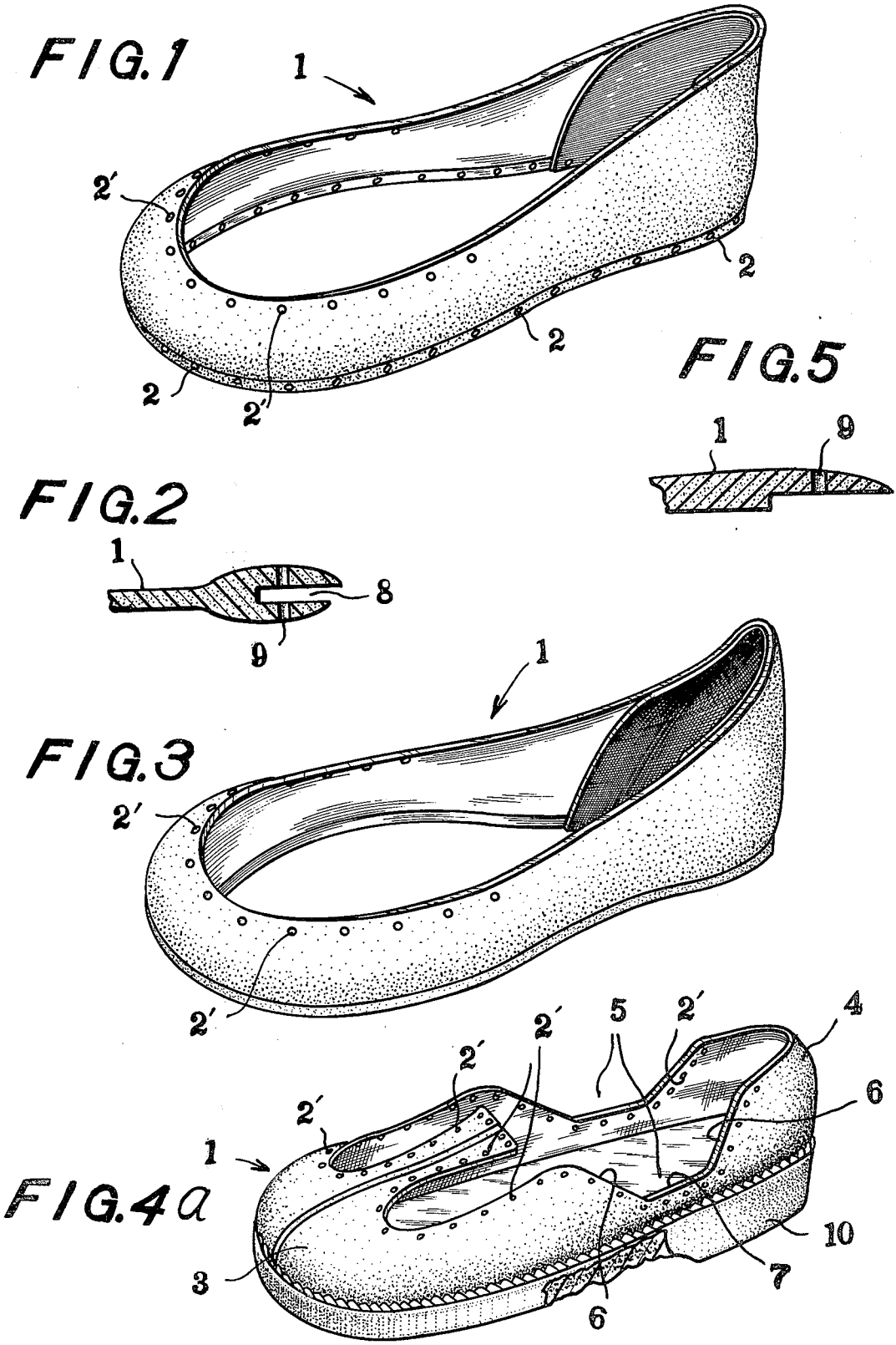

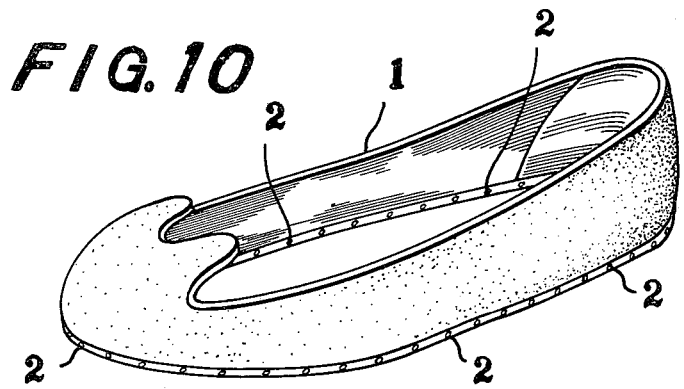
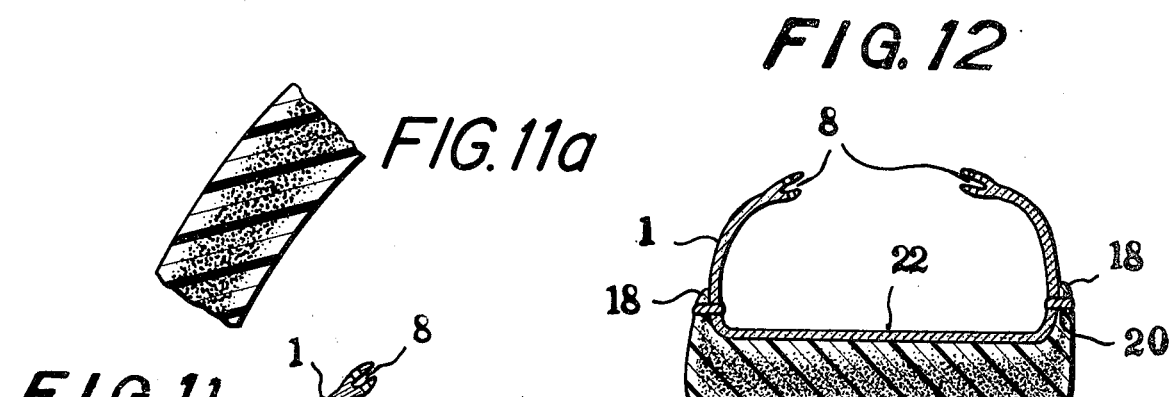
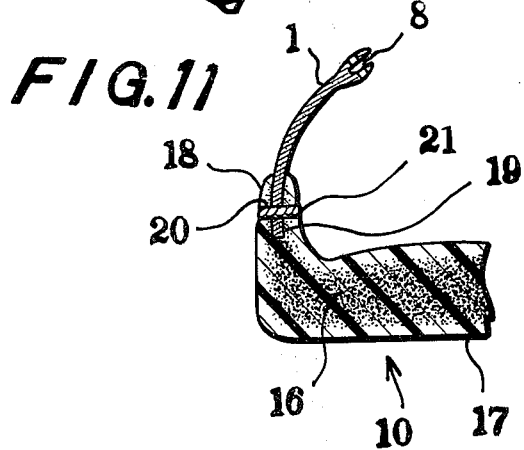
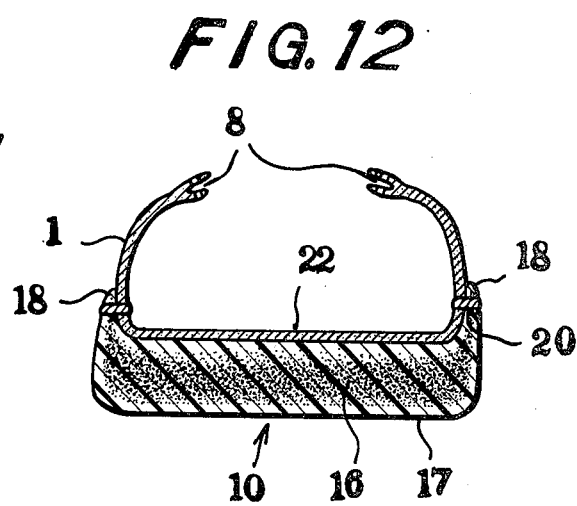
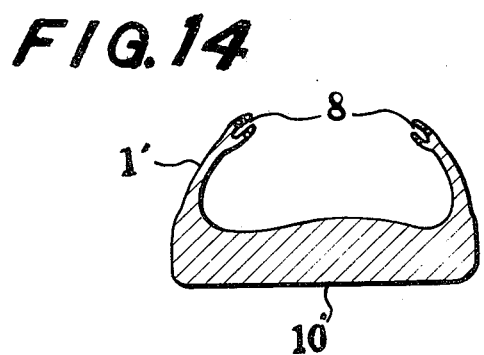
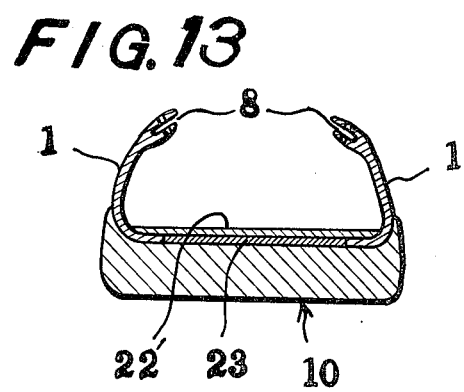

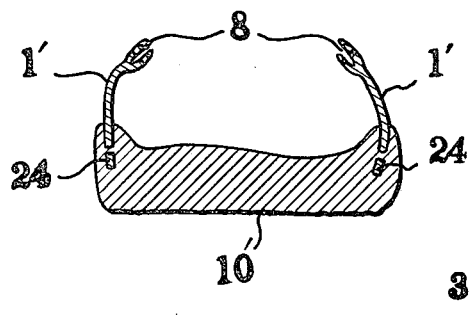
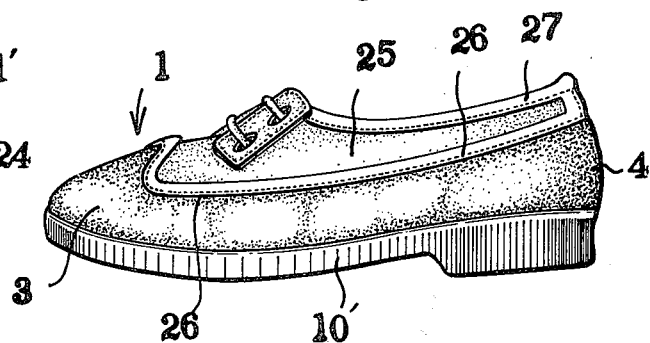
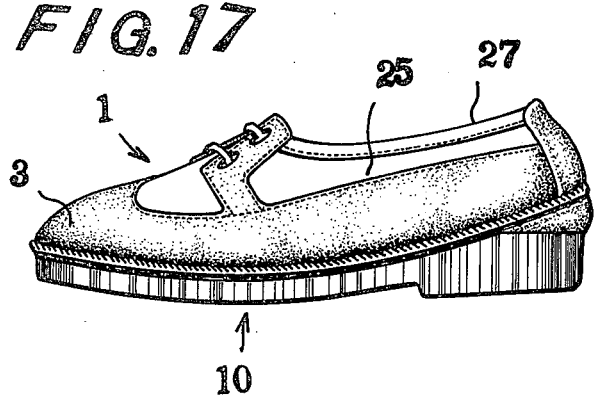
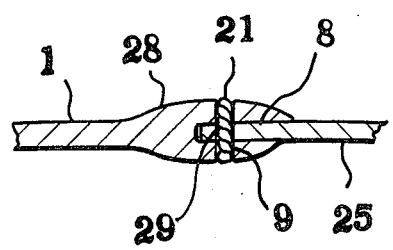
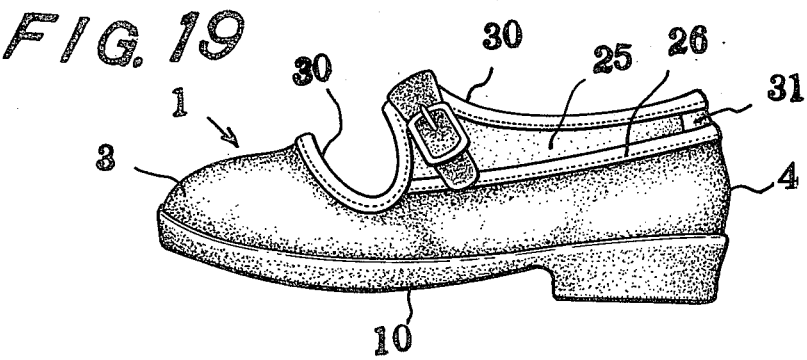
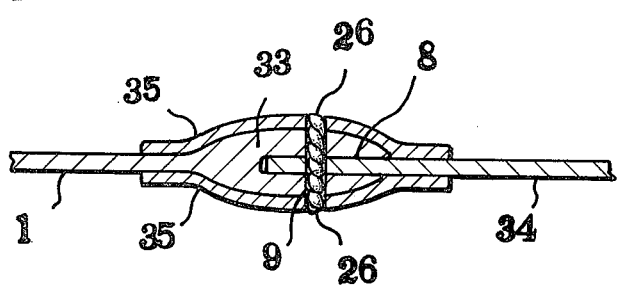

FIG. 29
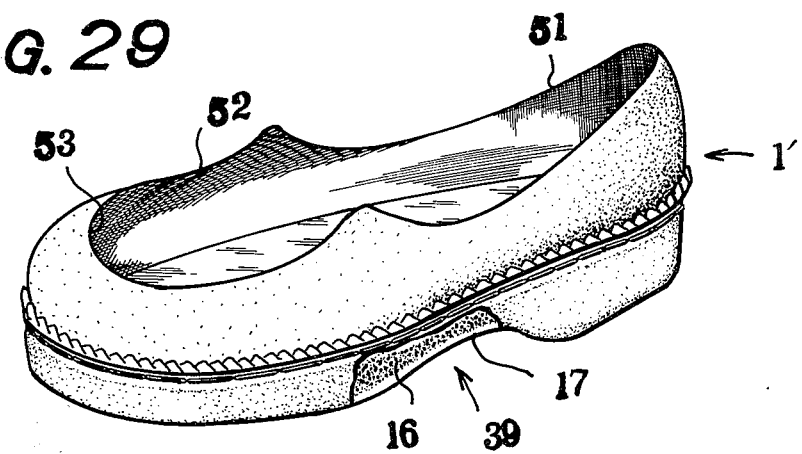
FIG. 30
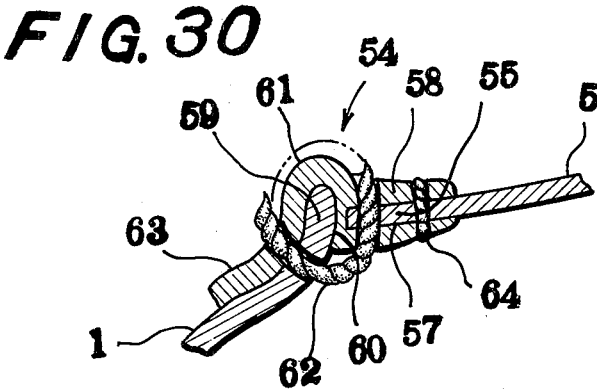
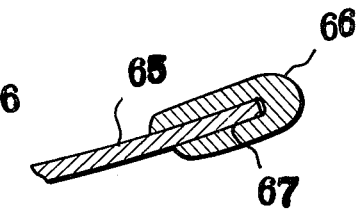
FIG. 31
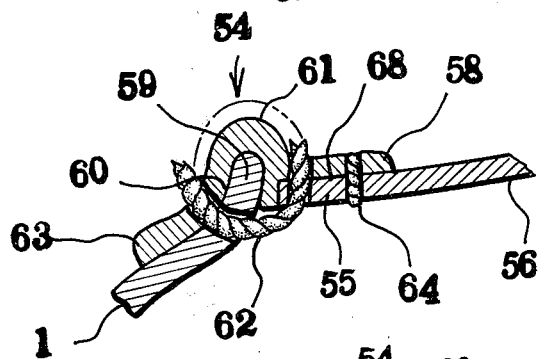
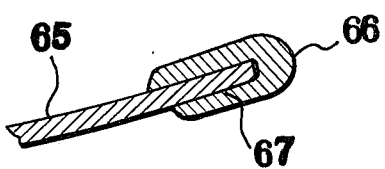
FIG. 32
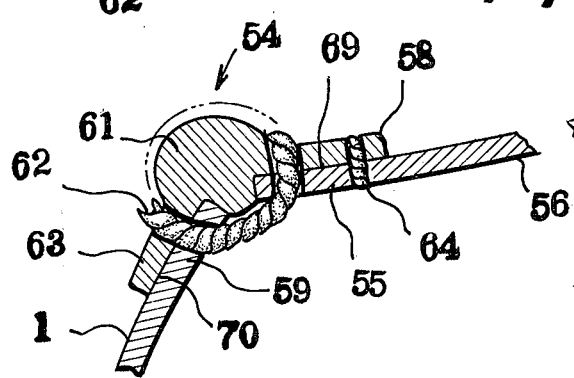
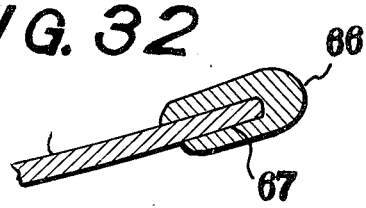

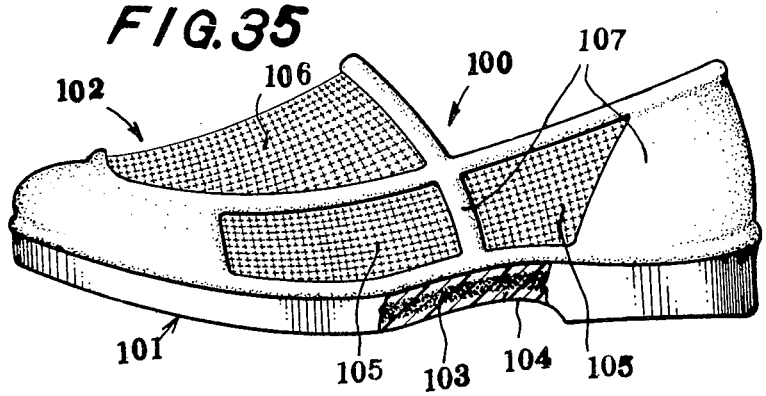
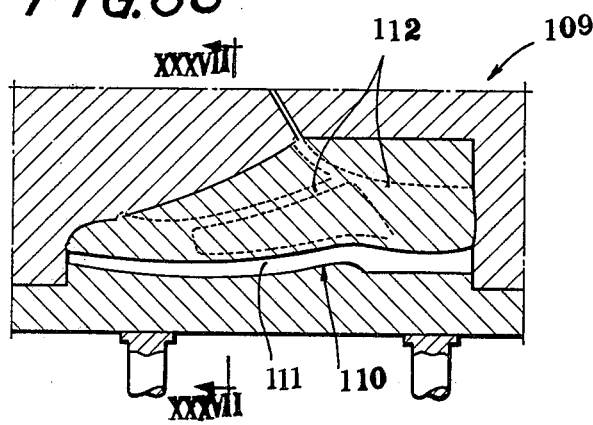
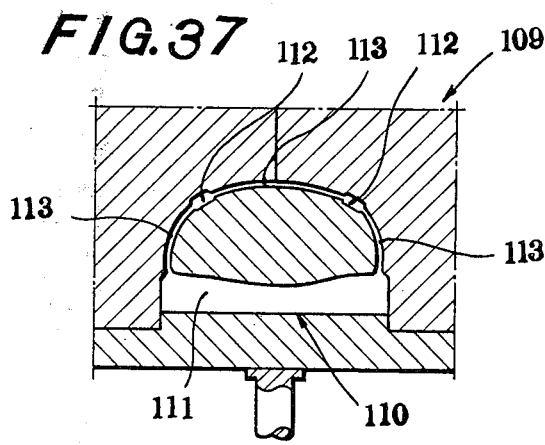

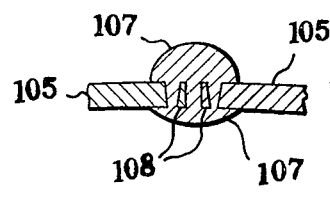
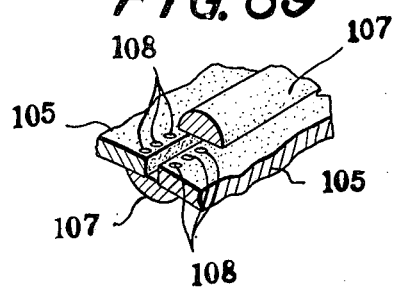
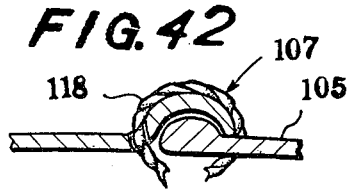
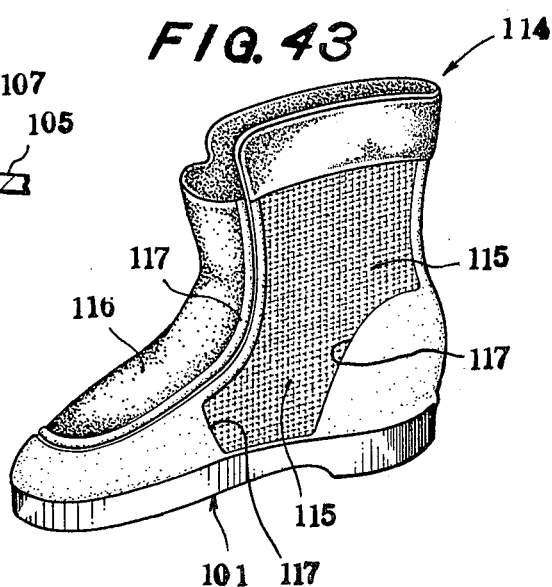

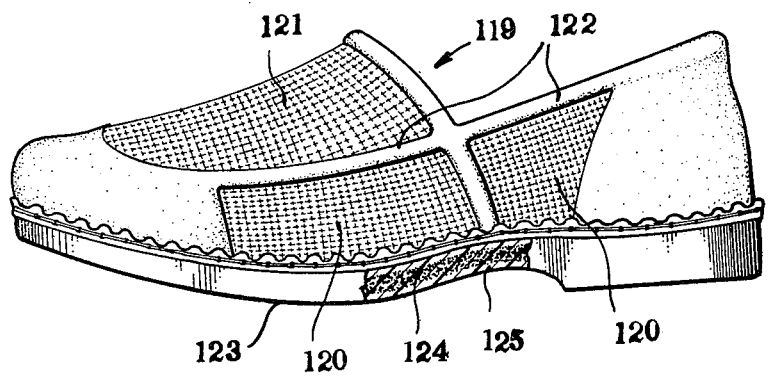
FIG. 44
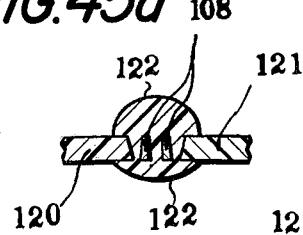
FIG. 45a
FIG. 45
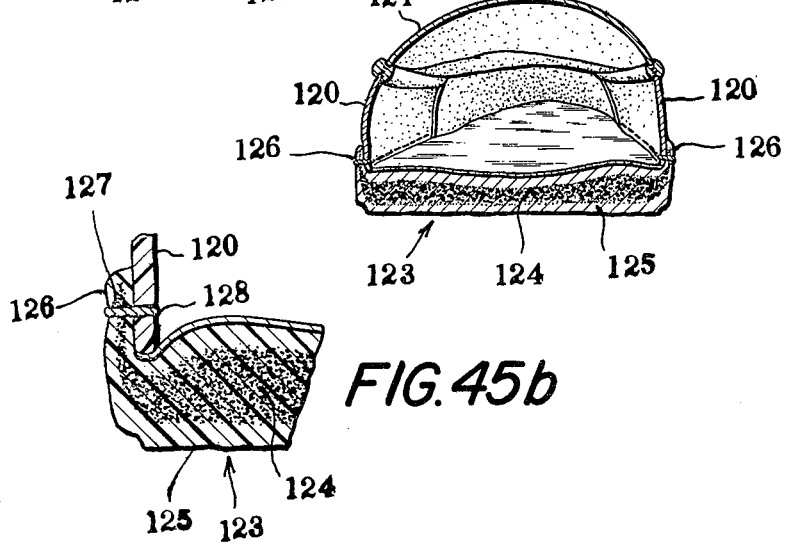
FIG. 45b

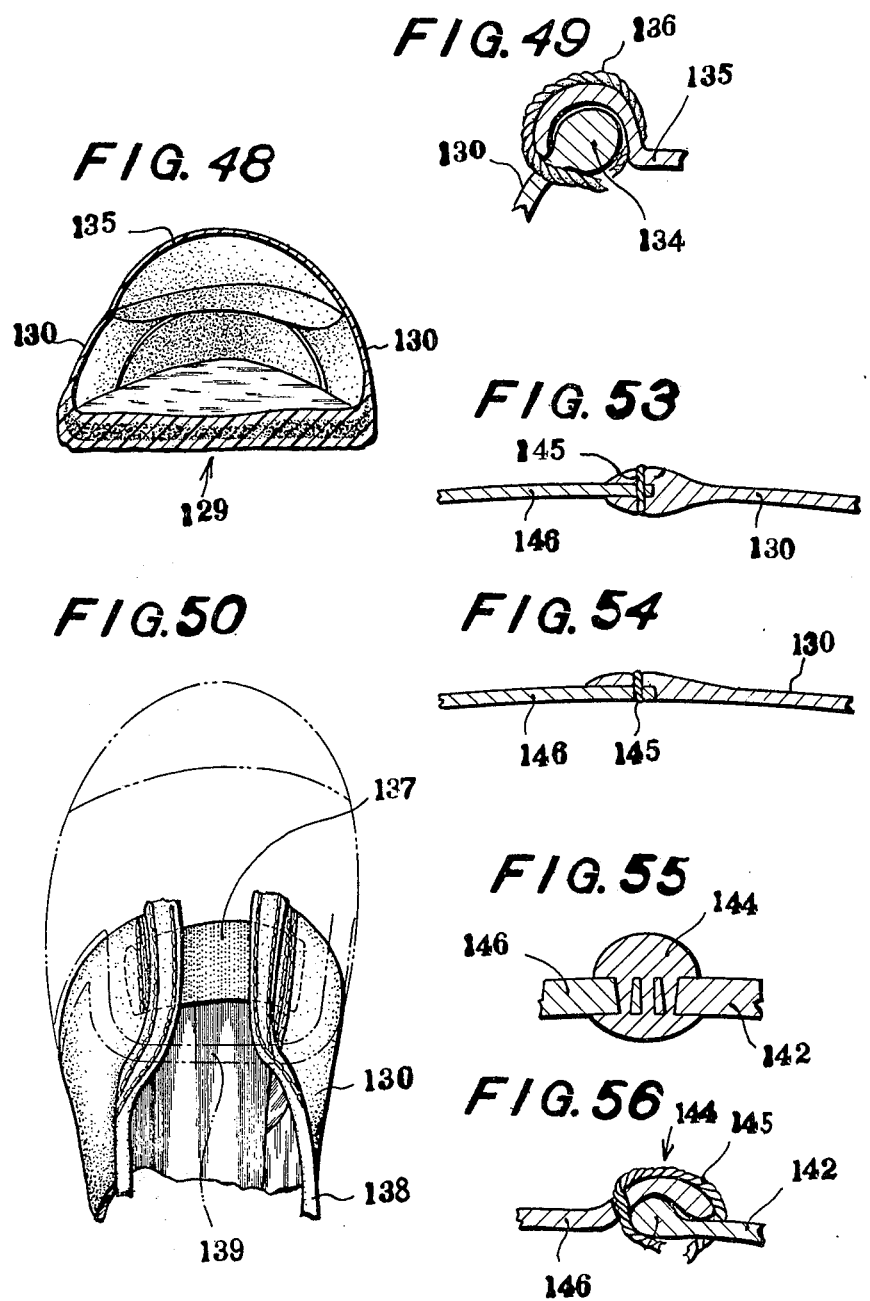

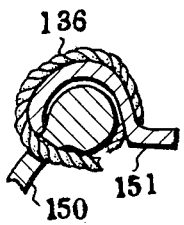
FIG. 57a
FIG. 57
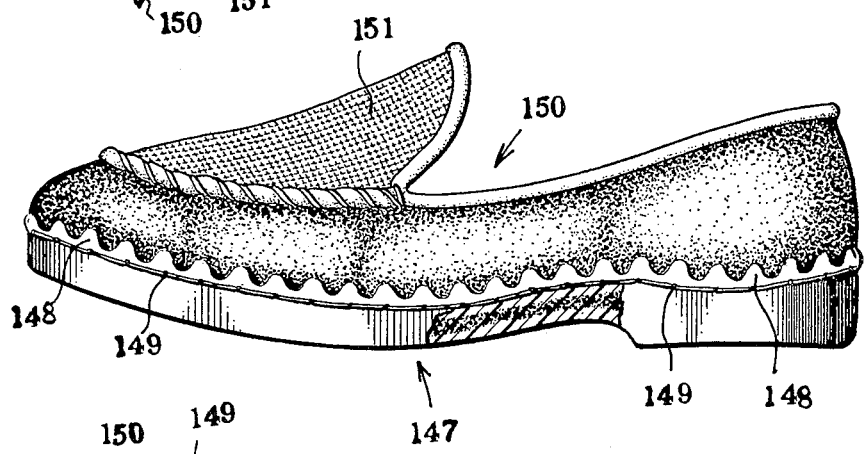
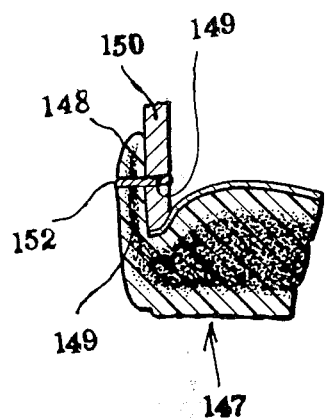
FIG. 57b

SHOE AND A METHOD FOR MANUFACTURING THE SAME

This application is a continuation-in-part of my prior application entitled "Foorwear," Ser. No. 402,967, filed Oct. 3, 1973, now abandoned.

The present invention relates to an improved method for manufacturing a shoe and a shoe manufactured thereby.

According to the conventional method, much art, skill, labor and time have been needed for manufacturing a shoe. Therefore, there is a contradictory problem to be solved of improving comfortableness to wear, retaining predetermined shape after use and varifying design in addition to a problem how to economically and effectively manufacture a shoe. The inventor has been studying this subject for many years and now found the solution therefor by applying the following arrangement.

A shoe is generally considered to consist of three sections, namely, a lateral side section of upper, an upper vamp section and a sole, and that difficulties in the art of three dimensional shaping, retaining the three dimensional shape, improving comfortableness to wear and manufacturing by dealing with material consist concnetratedly in the part of the lateral side section of upper. Therefore, the inventor has succeeded in developing a method for manufacturing a shoe in which said shoe is generally divided into three sections, namely, an upper vamp section, a lateral side section and a sole, and at least the upper vamp section of natural or synthetic leather or fabric or non-woven fabric material is connected to the lateral side section integrally and three-dimensionally molded of synthetic resinous material. The molding material for the lateral side section of upper has for its main ingredient a required synthetic resinous composition such as a composition including vinyl chloride resin, ethylene vinyl acetate copolymer resin, polyurethan resin or the like, but a foamed composition is preferable. Such molding material may be molded into a lateral side section of upper together with non-woven fabric. Another material may be used together with resinous material, and further, synthetic leather may be used.

To said lateral side section connected are the upper vamp section and the sole. The upper peripheral edge of the lateral side section is connected to the lower peripheral edge of the upper vamp section by manual work such as seaming or binding together.

In this case it may be so arranged that diameter of each of openings provided on the peripheral edges of the lateral side section and the upper vamp section for seaming or binding together is larger than that of a thread passing therethrough, whereby air-permeability of the shoe is obtained. This connection by seaming or binding together can provide some decorative effect on the edge portions thus connected. The lateral side section and the sole may be connected together by a known method. If desired, the two sections may be integrally formed, and an insole may be provided extending over the lower peripheral edge of the lateral side section during or after molding. Lining or backing of the lateral side section may be effected at the same time with the molding of the lateral side section by previously mounting lining or backing cloth on the mold, or after the molding of the lateral side section.

A shoe according to the present invention has the following advantages in comparison with the conventional chemical shoe.

1. Art, labor and time required can be sharply saved, and also material can be saved.

For example, a. Pasting of leather for a lateral side section can be cut thereby saving labor therefor.
   2. An inner padding cloth is unnecessary, thereby saving material and labor therefor.
   3. Cutting and machine-sewing for forming an upper is unnecessary, thereby saving material and labor therefor.
   4. Steps for molding and lasting a toe cap section and a counter section are unnecessary, thereby saving material, adhesive agent and labor therefor.
   5. Steps for pulling the lasting, for which the most special art and skill are conventionally needed, are unnecessary, thereby saving much skilled labor and time therefor.
   6. Heat-treating step for finishing is unnecessary, thereby saving labor, time and energy therefor.
   7. Through all the manufacturing steps, nearly 40 percent of the material cost and nearly 60 percent of labor can be saved.
   8. Wooden patterns and alluminum patterns (of prototype), which are expensive and have been indispensable in the conventional method, are unnecessary, thus affording to lower the manufacturing cost and save labor for manufacture.

2. Other advantages

1. An insole is easily mounted and fixed, by the interposition of a more or less resilient lateral side section of upper integrally molded, suitably shaped and shape-retained. Mounting of an insole may be further improved by providing fitting portions on the lower periphery of a lateral side section of upper, the periphery of a sole and a shape-retaining and connecting member of the sole.
   2. Since a lateral side section is molded in a molding cavity, said section can be formed without fail into a required three dimensional shape, and formed in any varified shape as required, thus affording to improve the appearance and comfortableness in use. Further, because of such molding a shoe has an excellent shape-restoring property, so that a shoe of the present invention is prevented from shape-loosing especially in the three-dimensional lateral side section of upper even after long use.

In this connection, in the conventional chemical shoe, a lateral side section of upper is manufactured by cutting a flat sheet into a required pattern, and then forming the same into a three-dimensional shape by means of a pattern, so that shaping freely as required is difficult, and especially difficult is shape-retaining of the shoe after long use. Further, in the conventional manufacturing method, a large amount of material is lost and nearly 20 percent of the material is wasted in the cutting step. The method of the present invention can prevent such a loss.
   3. Since a lateral side section of upper can be molded into any desired shape, a variety of shoe designs are obtained. An upper vamp section to be connected to the lateral side section is formed of natural or synthetic leather or other material. Therefore, the upper vamp section and the lateral side section of upper can be made different not only in material but in design, whereby a various designs of shoe can be obtained. Further, a sole to be connected to the lateral side section can be formed of different material from that of the latter, and also variously designed. Further, air-permeability of a shoe is improved by providing a cut-away portion in the lateral side section and mounting an air-permeable or porous sheet over the cut-away portion, or by forming the upper vamp section of air permeable or porous sheet.

As abovementioned, according to the present invention, a shoe is generally divided into three sections, namely, a lateral side section of upper, an upper vamp section and a sole. And the lateral side section, which requires the most high skill for manufacturing and is difficult to be formed into a suitable three dimensional shape, is molded of synthetic resinous material in a molding cavity and easily and correctly formed into a required three-dimensional shape, whereby a large amount of labor, time and material can be saved. Further, an upper vamp section formed of natural or synthetic leather is connected to the lateral side section by handwork of seaming or binding together to obtain refined appearance and adjusting the shape to improve comfortableness to wear, and varifying design and material of each part of a shoe to obtain a variety of designs.

Further, another object of the present invention is to provide a method for manufacturing a shoe, the lateral side section and the sole of which are integrally and three-dimensionally molded of synthetic resinous material in the mold, and a shoe manufactured thereby.

Another object of the present invention is to provide a method for manufacturing a shoe, the lateral side section of which is integrally and three-dimensionally molded of synthetic material, thereafter said lateral side section being connected to a sole manufactured separately from said lateral side section, and a shoe manufactured thereby.

Another object of the present invention is to provide a method for manufacturing a shoe, the lateral section of which is integrally and three-dimensionally molded of synthetic resinous material and thereafter said lateral side section being connected to a sole by means of a shape-retaining and connecting member integrally and upwardly protruded from the sole, and a shoe manufactured thereby.

Another object of the present invention is to provide a method for manufacturing a shoe, two or more parts of the lateral side section of which are connected to each other or one another by means of a shape-retaining and connecting member molded of synthetic resinous material, and a shoe manufactured thereby.

Another object of the present invention is to further provide a method for manufacturing a shoe, the lateral side section of which includes a part or the whole of an upper vamp section, and a shoe manufactured thereby.

A further object of the present invention is to provide a method for manufacturing a shoe, the lateral side section and/or the upper vamp section of which are provided with a cut-away section, said cut-away section being compensated with a compensating section made of a material other than that of the lateral side section, and a shoe manufactured thereby.

The present invention will become more apparent from the following detailed description of the embodiments with reference to the appended drawings.

FIG. 1 is a perspective view of a lateral side section of upper according to the present invention;

FIG. 2 is an enlarged section of expanded edge portion of a lateral side section of upper according to the present invention;

FIG. 3 is a perspective view of a modification of a lateral side section of upper according to the present invention;

FIG. 5 is an enlarged sectional view of expanded edge of the lateral side section of FIG. 4A;

FIG. 10 is a perspective view of a further modification of a lateral side section of upper according to the present invention;

FIG. 11 is a partly cut-away sectional view showing the connection between a lateral side section of upper and a sole according to the present invention;

FIG. 12 is a sectional view of a modification of the connection of FIG. 11;

FIG. 13 is a sectional view of a further modification of the connection of FIG. 11;

FIG. 14 is a sectional view of a further modification of the connection of FIG. 11;

FIG. 15 is a sectional view of a further modification of the connection of FIG. 11;

FIG. 16 is a front view of a shoe according to the present invention;

FIG. 17 is a front view of a modification of the shoe of FIG. 16;

FIG. 18 is an enlarged sectional view of the connection between the lateral side section of upper and the upper vamp section of the shoe of FIG. 17;

FIG. 19 is a front view of a further modification of the shoe of FIG. 16;

FIG. 21 is an enlarged sectional view showing the connection between an intermediate section and a lateral side section of upper;

FIG. 29 is a perspective view of a lateral side section of upper according to the present invention provided with a sole;

FIG. 30 is an enlarged sectional view of a shape-retaining and connecting member according to the present invention;

FIG. 31 is an enlarged sectional view of a modification of the shape-retaining and connecting member according to the present invention;

FIG. 32 is an enlarged sectional view of a further modification of the shape-retaining and connecting member according to the present invention;

FIG. 35 is a front view of a shoe according to the present invention;

FIG. 36 is a sectional view of the main part of a mold for molding the shoe of FIG. 35;

FIG. 37 is a sectional view taken along the line XXXVII—XXXVII in FIG. 36;

FIG. 38 is a sectional view of a shape-retaining and connecting member according to the present invention;

FIG. 39 is a partly cut-away perspective view of the shape-retaining and connecting member of FIG. 38;

FIG. 40 is a sectional view of a modification of the member of FIG. 38;

FIG. 41 is a sectional view of another modification of the member of FIG. 38;

FIG. 42 is a sectional view of a further modification of the member of FIG. 38;

FIG. 43 is a perspective view of a half boot according to the present invention;

FIG. 44 is a front view of a modification of the shoe according to the present invention;

FIG. 45 is a sectional view of the shoe of FIG. 44;

FIG. 48 is a traverse cross-sectional view of the shoe of FIG. 46;

FIG. 49 is an enlarged sectional view of the shape-retaining and connecting member according to the present invention;

FIG. 50 is a plan diagram illustrating the connection of a connecting band according to the present invention;

FIG. 53 is a sectional view of a shape-retaining and connecting member according to the present invention;

FIG. 54 is a sectional view of a modification of the member of FIG. 53;

FIG. 55 is a sectional view of another modification of the member of FIG. 53;

FIG. 56 is a sectional view of a further modification of FIG. 53;

FIG. 57 is a front view of a further modification of the shoe according to the present invention;

Figure 4C:
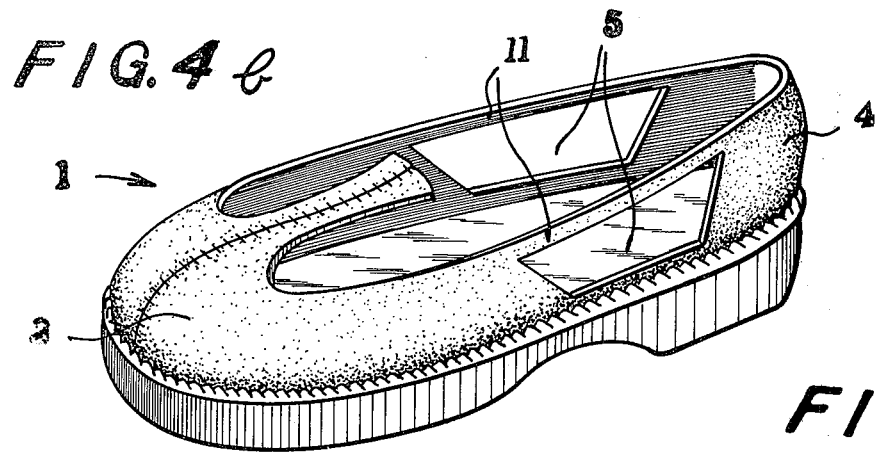
FIG. 4A is a perspective view of a modification of a lateral side section of upper provided with a sole.
FIG. 4B is a perspective view of a modification of the lateral side section of FIG. 4A.

Referring to FIG. 1, a lateral side section of upper 1 is molded into a required shape of synthetic resinous material in a cavity by means of the conventional mold. The lateral side section of upper may be integrally molded of an appropriate foaming resinous composition such as a polyurethan resinous composition in a molding cavity and has a foamed inner layer and a non-foamy outer layer completely surrounding the former, the boundary of the two layers being either visible or invisible.

In the drawings, the identical numerals are given to parts, members and others which are identical or similar to one anothers.

Examples for molding the lateral side section 1 are set forth below.

EXAMPLE 1

100 Parts of isocianate (under trade name of Shoeprene 30C manufactured by Mitsui Toatsu Co., Ltd.) and 39 parts of Polyol (Shoeprene 10P of Mitsui Toatsu Co., Ltd.) are mixed, and if necessary, further mixed with pigments or others and then injected into a mold at the temperature of 40°–50° C. After about 6–7 minutes, the resinous material becomes hardened, and then molded lateral side section 1 is taken out therefrom.

EXAMPLE 2

100 parts of vinyl chloride, 80 parts of plasticizer (D.O.P.), 3 parts of stabilizer (under the trade name of OF-14 manufactured by Adecoagas Co.) and 0.5 part of foaming agent (azodicarbonamide) are mixed and injected into a metallic mold. If necessary, an additive is mixed. The mold then is at the temperature of about 35° C, while the melting point of the material is about 185° C. This molding is injection molding. After that, the molded lateral side section of upper 1 is taken out therefrom.

The lateral side section 1 as shown in FIG. 1 is provided with small openings 2 for connecting at its lower peripheral edge and small openings 2' for connecting at the front part of the upper peripheral edge thereof. The lateral side section 1 as shown in FIG. 3 is not provided with the small opening 2 in FIG. 1.

In FIGS. 4A and 4B the lateral side section 1 has a cut-away portion 5 between a toe cap section 3 and a counter section 4.

In FIG. 4A, the inclined edges 6, 6 and the lower edge 7 of the cut-away portion 5 are provided with expanded peripheral edges having a channel 8 for fitting and small opening 9 as shown in FIG. 2 while the subject construction may be modified as shown in FIG. 5. On the upper peripheral edges of the toe cap section 3 including a central protrusion thereof, a number of small openings 2' for connecting or seaming. Similarly, small openings 2' are provided on the inclined edges 6, 6 and the lower edge 7. A sole 10 may be molded integral with the lateral side section 1 in a molding cavity, or connected to the lateral side section 1 by the conventional method such as seaming, pulling and/or lasting. Preferably, the sole 10 comprises a foamed inner layer and a non-foamy outer layer completely surrounding said inner layer, the boundary between the two layers being visible or invisible. The sole has a construction in its cross section wherein the mean particle diameter of the bubbles is successively growing larger from the surface towards the center throughout the non-foamy outer layer and the foamed inner layer. The surface of the sole 10 has such a shape that the peripheral edge portion is being raised, and the shank portion is also being raised, while the toe portion and the heel portion are recessed, said recesses of the heal portion and the toe portion being communicated with each other through a generously recessed portion along the shank portion. An insole of a thin sheet may be provided to be spread over the lower edge of the lateral side section 8 during or after molding.

The lateral side section 1 as shown in FIG. 4B is provided with an upper bridge 11 formed integrally with the section 1 or a tape.

Figure 6:
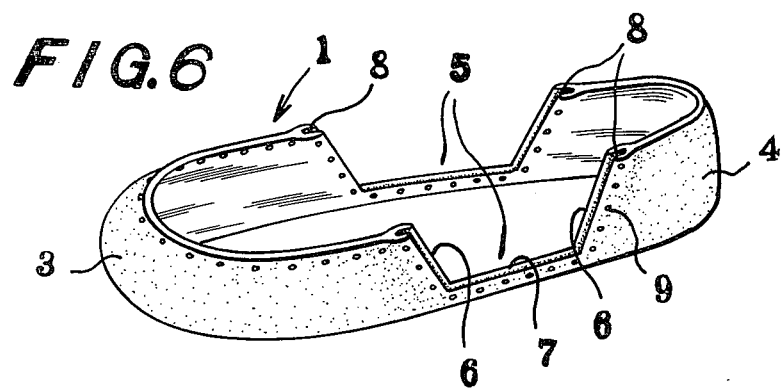
FIG. 6 is a perspective view of a modification of a lateral side section of upper according to the present invention.

In FIG. 6 is shown the lateral side section 1. Air-permeability can be obtained by making the diameter of the opening 2' larger than that of thread to be mentioned below for seaming or binding together.

Figure 7:
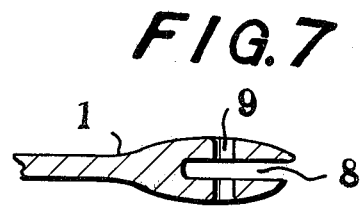
FIG. 7 is an enlarged sectional view of the expanded edge of the lateral side section of FIG. 6.
Figure 9:
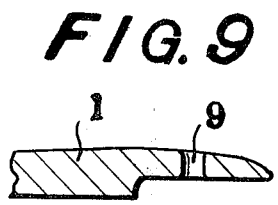
FIG. 9 is an enlarged section of expanded edge portion of the lateral side section of FIG. 8.
Figure 8:
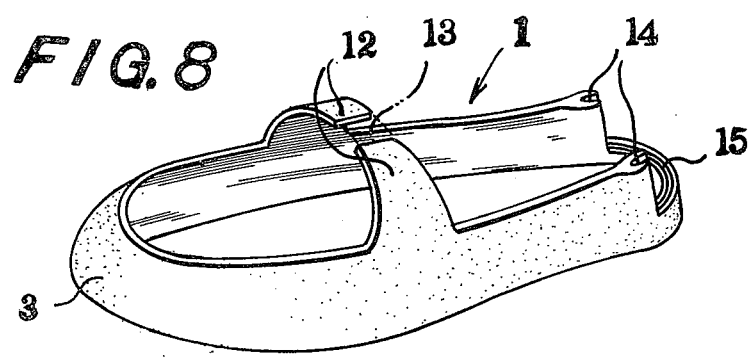
FIG. 8 is a perspective view of a modification of a lateral side section of upper according to the present invention.

The lateral side section 1 in FIG. 8 is provided with a pair of opposing protrusions 12, 12 for mounting a resilient member 13 are provided nearly in each central portion of the lateral side section, the counter section being provided with a cut-away portion 14 in which there are provided with two vertical recess 14 and one horizontal recess 15 in the expanded portion thereof. The cut-away portion as shown in FIG. 6 or FIG. 8 is provided with an expanded portion having a channel 8 for fittings and a small opening 9 as shown in FIG. 7 or FIG. 9 representing a modification of the expanded portion in FIG. 7.

A lateral side section 1 shown in FIG. 10 is substantially the same with that of FIG. 1.

The connection between a lateral side section and a sole is effected as follows.

A sole 10 shown in FIG. 11 is integrally molded of a foaming resinous composition such as polyurethan resin composition in a molding cavity, and comprises a foamed inner layer 16 and a non-foamy outer layer 17 compretely surrounding said inner layer, the boundary between said two layers being visible or invisible. The sole has such a construction in its cross section that the main particle diameter of the bubbles is successively growing larger from the surface towards the center through the nonfoamy outer layer and the foamed inner layer. The surface of the sole is possessing such a shape that the peripheral edge portion is being raised, the shank portion being also raised, while the toe cap section and the heel section are recessed, said recesses of the heel portion and the toe portion are communicated with each other through a generously recessed portion along the shank portion.

A shape-retaining and connecting member 18 is integrally and upwardly protruded from the sole 10 throughout the peripheral edge thereof. The shape-retaining and connecting member 18 is provided with a recess 19 for fitting. On the other hand, the lower peripheral edge portion protruded from a lateral side section e.g. as shown in FIG. 1, is fitted into the recess 19 of the shape-retaining and connecting member 18 of the sole 10. And by aligning each one of small openings 2 provided on the peripheral edge portion with each one of small openings 20 provided on the connecting member 18, the member 18 and the peripheral edge portion are seamed or bound together with a thread 21.

A sole 10 as shown in FIG. 12 is similarly provided with a shape-retaining and connecting member 18 having a number of small openings 20. On the lower peripheral edgee of a lateral side section of upper 1 e.g. of FIG. 1 is provided with an insole 22. After conventionally connecting or binding said insole onto the surface of the sole 10 by seaming or adhesive agent, the protruded portion of the lower peripheral edge of the lateral side section 1 is disposed in contact with the inside of the connecting member 18, and each small opening 2 is aligned with each small opening 20 of the connecting member of the sole, and then the connecting member and the protruded portion are seamed or bound together with a thread or adhesive agent.

Referring to FIG. 13, the lower peripheral edge of the lateral side section 1 e.g. of FIG. 3 is inwardly folded, and the folded edge is adhered to a sole 10 with adhesive agent, and further, an insole 22' is mounted and if necessary a filling material 23 is provided.

Referring to FIG. 14, a lateral side section 1' and a sole 10' are integrally molded in the conventional molding cavity.

FIG. 15 illustrates an example of the present invention in which when the lower peripheral edge of a lateral side section 1 of upper molded of an urethan resin composition is molded integrally with a sole 10' of vinyl chloride resin composition, said lower peripheral edge of lateral side section is embeddedly connected to the surface of the peripheral edge of the sole. It is preferable that in such a case of resins of low intersolubility, provided in the part of the sole adjacent to the lower peripheral edge of the lateral side section is an opening band 24 or a number of openings for ensuring embedded connection.

Further, examples of connection of a lateral side section, a sole and an upper vamp section are as follows.

As shown in FIG. 16, a lateral side section 1 without small opening 2 shown in FIG. 1 is molded mainly of foamed polyurethan resin material of 2 times of foaming ratio. On the other hand, a sole as shown in FIG. 15 is molded mainly of vinyl chloride resin of 1.5 times of foaming ratio. In molding, the lower peripheral edge of the lateral side section is embedded into the surface of the peripheral edge of the sole 10'. Said two resins are of low intersolubility with respect to each other, an opening tie 24 or a number of small openings are provided on the required position of the sole. An upper vamp section 25 formed of natural or synthetic leather is mounted on the lateral side section of upper 1 in the following manner.

The lower peripheral edge of the upper vamp section 25 is fitted into the channel 8 of the expanded portion of the lateral side section 1, and a number of small openings provided on the lower peripheral edge of the upper vamp section 25 is disposed in correspondence with the small openings for seaming of the lateral side section 1, so that the corresponding parts of said two sections are seamed together with a thread 26. In the drawing shown in a tape 27 provided with a number of openings.

As shown in FIG. 17, a lateral side section 1 of upper is formed mainly of foamed polyurethan resin of expanded ratio 1.5. The sole 10 is formed mainly of vinyl chloride of expanded ratio 1.3 and has such a construction as shown in FIG. 11. The lower peripheral edge of the lateral side section of upper is fitted into the channel of the shape-retaining and connecting member as shown in FIG. 11, and the small openings of the shape-retaining and connecting member are disposed in correspondence with the small openings provided on the lower peripheral edge of the lateral side section respectively so that the member and the section are seamed together with a thread.

As shown in FIG. 18, the lower peripheral edge of an upper vamp section 25 of natural or synthetic leather is fitted into a channel 8 of an expanded portion 28 of the upper edge of a lateral side section 1 or 1', and the small openings 9 of the expanded portion 28 are disposed in correspondence with the small openings 29 of the lower peripheral edge of an upper vamp section 25 respectively, so that the peripheral edge of the upper vamp section is seamed with the upper peripheral edge of the lateral side section with a thread 26.

As shown in FIG. 19, a lateral side section 1 of upper is molded of foamed vinyl chloride resin of expansion ratio 1.5. On the other hand, a sole 10 is formed of material including synthetic rubber as a main ingredient. The lateral side section of upper is mounted on the sole with adhesive agent, or by the conventional method. An upper vamp section 25 is mounted on the lateral side section of upper 1 by the same method as shown in FIG. 18. In the drawing shown are a tape 30 provided with a number of openings and a strip 31 extended from the heel portion of the lateral side section.

Figure 20:
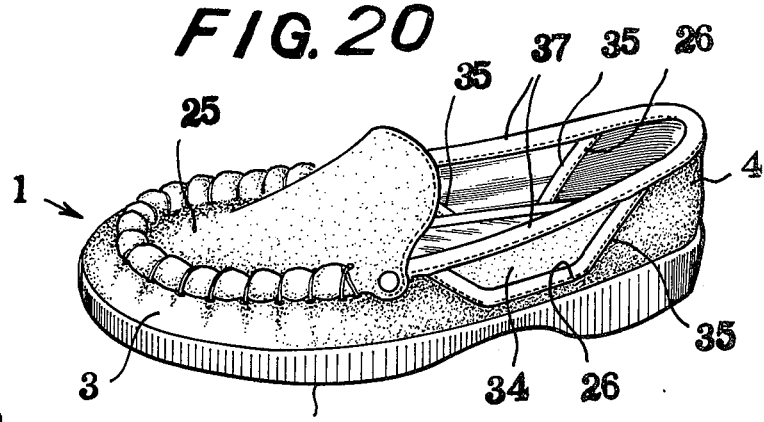
FIG. 20 is a perspective view of a further modification of the shoe of FIG. 16.

As shown in FIGS. 20 and 21, a lateral side section 1 of upper of the same construction with the section 1 of FIG. 6 is integrally molded in the conventional molding cavity of material including soft vinyl chloride resin as the main ingredient. On the other hand, a sole 32 is molded of material including semirigid vinyl chloride resin as the main ingredient with nitrile rubber as a plasticizer. The lateral side section of upper is connected to the sole in such a manner as shown in FIG. 13. The inclined edges (those of FIG. 6) and the lower edge (that of FIG. 6) of a cut-away portion 5 (e.g. 5 of FIG. 6) provided between a toe cap section 3 and a counter section 4 of the lateral side section 1 each have an expanded portion 33 with a channel 8, into which the corresponding edge of an intermediate section 34 is fitted. The intermediate section 34 is formed of a sheet or cloth of natural or synthetic fiber material (including fabric), natural or synthetic leather, vinyl chloride, polyurethan or other synthetic resinous material, or other materials. The section may be formed of an airpermeable leather or sheet, or porous sheet thereby obtaining airpermeability. A number of small openings 9 for seaming are provided on an expanded portion 33 of the peripheral edge. A number of small openings 9' provided on the peripheral edge of the intermediate section are disposed each in correspondence with each of said openings 9. Then, with tapes 35, 35 formed of similar material to that of the intermediate section, the connected portion of the expanded portion and the corresponding peripheral edge of the intermediate section are covered, and seamed together with a thread 26 through the openings 9 and 9'. The tapes 35, 35 may be dispensed with. A tape 37 covers the uppermost peripheral edges of the lateral side section and the intermediate section 34 while said openings 9 and 9' are provided thereon and the thread 26 is applied thereto.

Figure 22:
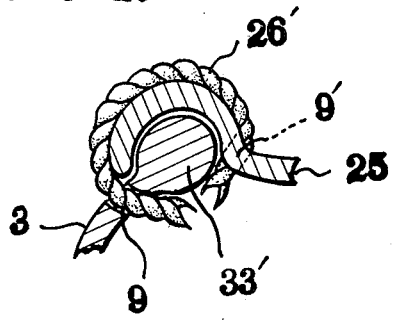
FIG. 22 is an enlarged sectional view showing the connection between the lateral side section of upper and the upper vamp section of FIG. 20.

As shown in FIG. 22, an expanded portion 33' provided on the upper peripheral edge of a toe cap section 3 is covered with a downward edge of an upper vamp section 25, and then, the upper vamp section and the lateral side section are bound together with an ornamental thread 26' through a number of small openings 9' of the upper vamp section and those 9 of the lateral side section. The intermediate section 34 is mounted on the lateral side section 1, but may be mounted afterward.

Figure 23:
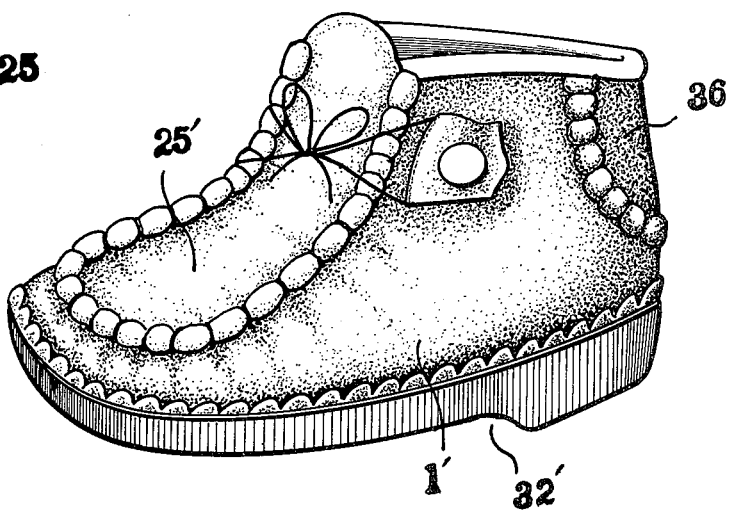
FIG. 23 is a perspective view of a further modification of the shoe of FIG. 16.

As shown in FIG. 23, a lateral side section 1' and a sole 32' are integrally molded of foamed soft polyurethan composition in the conventional molding cavity. An upper vamp section 25' and a rear portion 36 are formed of natural or synthetic leather material and bound to the lateral side section 1' in such a manner as shown in FIG. 22.

Figure 24:
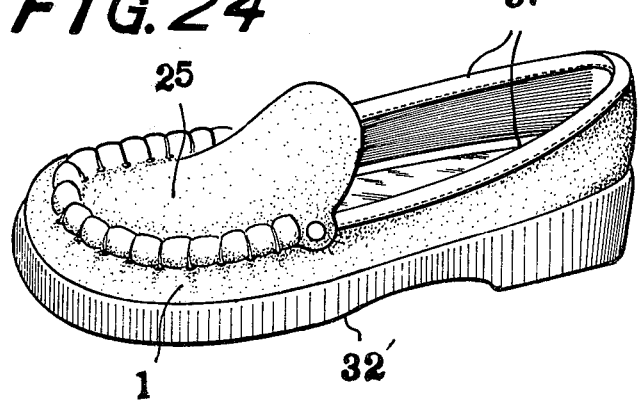
FIG. 24 is a perspective view of a further modification of the shoe of FIG. 16.

As shown in FIG. 24, a lateral side section 1 and a sole 32' are integrally molded of foamed soft vinyl chloride resin composition in a molding cavity. An upper vamp section 25 is bound to the lateral side section in such a manner as shown in FIG. 22. In the drawings shown is a tape 37 provided with a number of openings.

Figure 25:
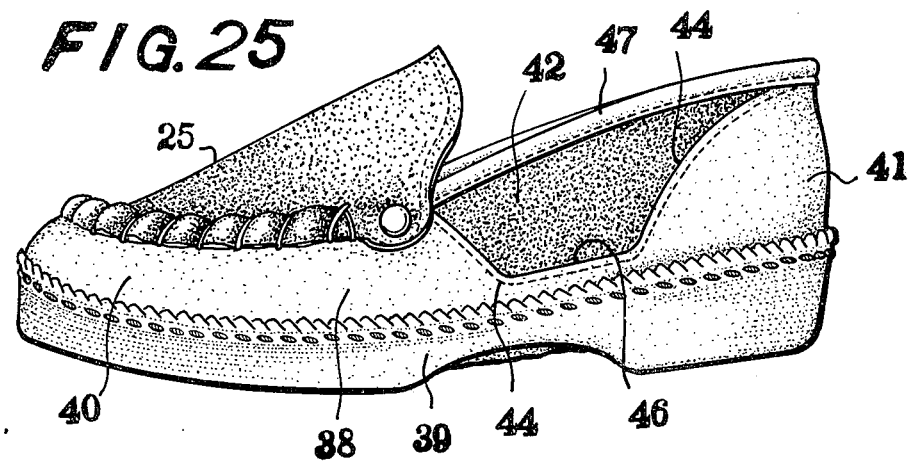
FIG. 25 is a perspective view of a further modification of the shoe of FIG. 16.
Figure 26:
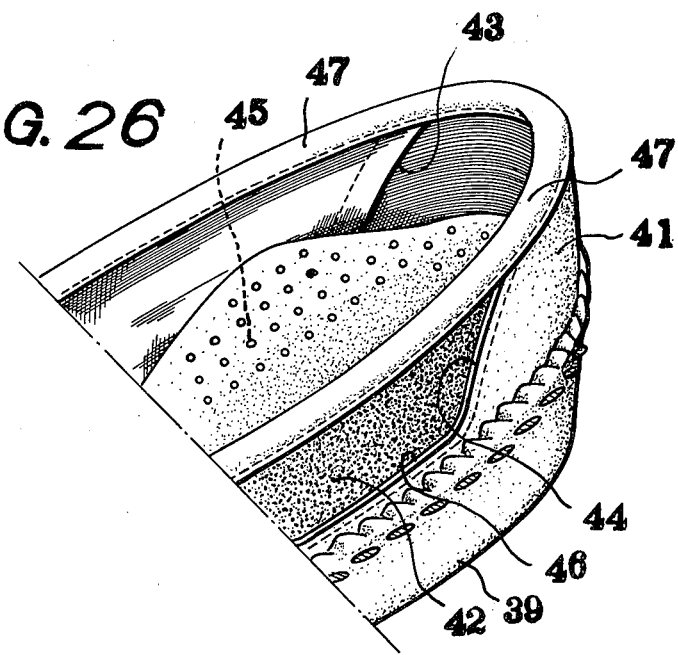
FIG. 26 is a perspective view for illustrating the heel section of the shoe of FIG. 25.

Referring to FIGS. 25, 26 a shoe has another construction differed from that shown in FIG. 20 as follows.

A lateral side section 38 and a sole 39 are integrally molded of foamed soft polyurethan composition or another non-foamy synthetic resinous material as suggested heretobefore or hereinafter. Between a toe cap section 40 and a counter section 41 the section 38 is provided with a cut-away portion. The cut-away portion is compensated with an intermediate section 42. That is, the intermediate section 42 made of a sheet or cloth of natural or synthetic fiber material (including fabric), natural or synthetic leather, vinyl chloride, polyurethan or other synthetic resinous material, or other materials (it may be formed of an airpermeable leather or sheet, or porous sheet thereby obtaining airpermeability) covers the cut-away portion by facing inclined edges 43, 43 thereof to inner surfaces of inclined edges 44, 44 of the cut-away portion of the section 38 and facing a lower edge 45 thereof to the inner surface of the inner edge 46 of the cut-away portion of the section 38, by adhering with the conventional adhesive agent and/or stitching with thread or machine sewing inclined edges each faced to each other and both the lower edges faced to each other. Further, a tape 47 covers the uppermost edges of the section 42 and section 38 which are firmly connected to one another by adhering with the conventional adhesive agent and/or stitching with thread or machine sewing.

Figure 27:
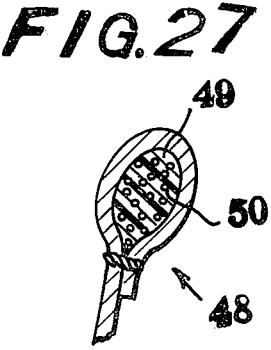
FIG. 27 is an enlarged sectional view of a cushioning portion according to the present invention.

In the embodiments shown in each of the drawings, a cushioning section 48 as shown in FIG. 27 may be provided in the portion, with which the foot contacts, of the lateral side section and/or the upper vamp section. The cushioning section 48 is formed by making round the extended portion of the lateral side section or the upper vamp section, fixing the end of the extended portion in the required position thereof and filling polyurethan, vinyl chloride or other highly foamed material 49 into the space 50 defined by said rounding-up of the extended portion.

Figure 67:
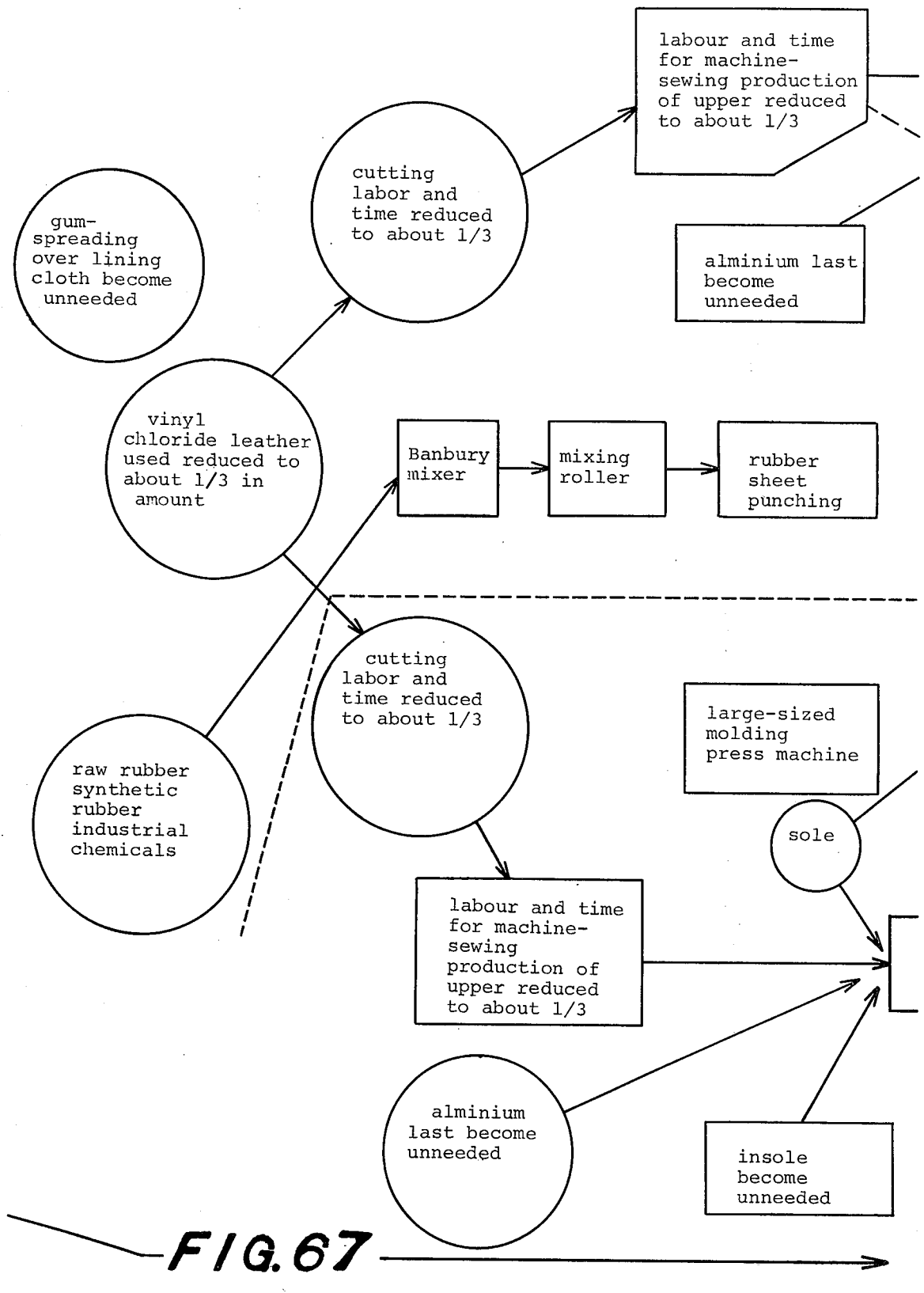
FIG. 67 is a diagram for summarizing reduction advantages effected by steps of the method according to the present invention in comparison with those of the conventional method.
Figure 67:
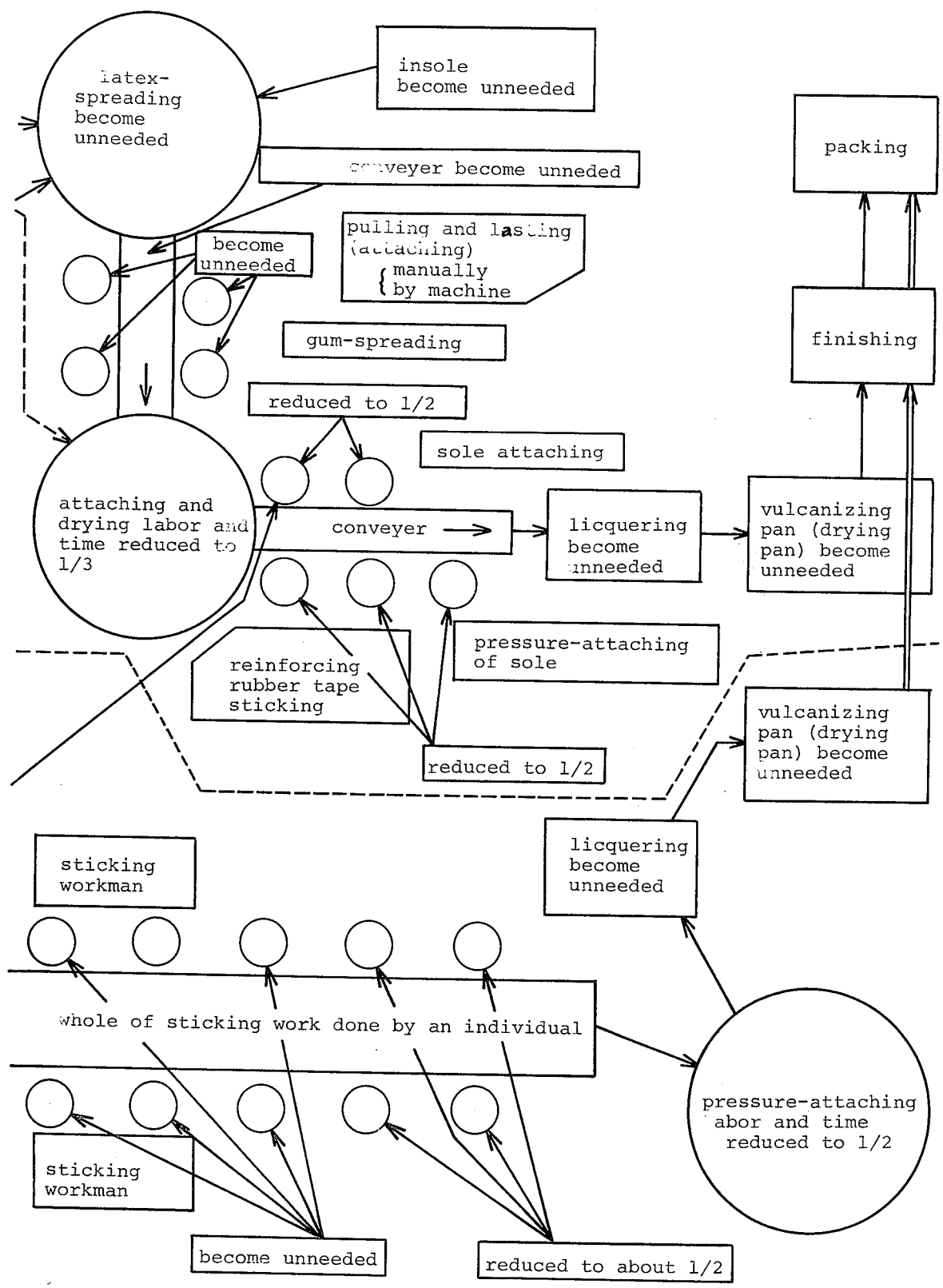

As abovementioned, according to the present invention the lateral side section of upper can be easily and accurately molded into any desired shape, which can be retained for a long time. Further, sections to be specially processed such as a toe cap section and a counter section can be manufactured without using any core mold for obtaining shape-retaining effect. And processing which needs special skill can be dispensed with. These result in saving much skill, time and material which are necessary in the conventional method, as illustrated in FIG. 67 demonstrating the advantages according to the present invention how to reduce time, labor and material in comparison with those indispensable for producing the conventional typed shoes by the known method. Further, many other advantages as abovementioned can be effected according to the present invention.

An upper, which is the most difficult section to be manufactured in the conventional method, can be easily obtained in a desired shape according to the present invention, whereby the subject of the present invention is substantially solved. Besides, a variety of shoe designs can be obtained by forming a lateral side section of upper of synthetic resin, and an upper vamp section of natural or synthetic leather thereby making the two sections different from each other in material and design thereof.

The main one of the advantages of the present invention is resulted from separating a lateral side section of upper from a shoe and molding the section of synthetic resin material. In the conventional method, a lateral side section of upper is most difficult to manufacture and especially by mass-production, requiring much labor, time and skill. On the contrary, according to the present invention, the section is easily obtained as abovementioned. And besides, at least an upper vamp section is formed by natural or synthetic leather, and the upper vamp section is connected to the lateral side section by seaming or binding together, thereby obtaining such an additional advantage that designes of each section of a shoe are varied without losing the quality of a conventional shoe.

Figure 28:
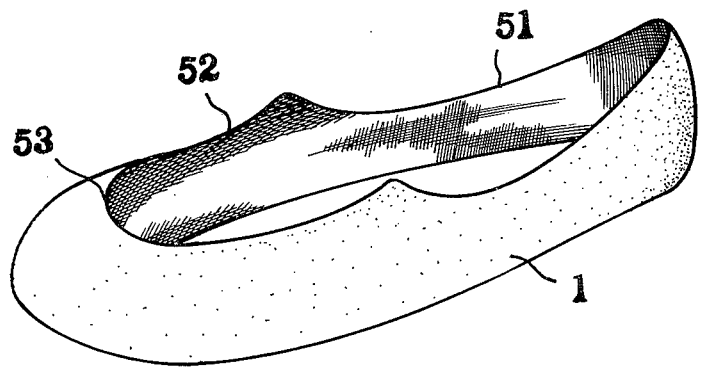
FIG. 28 is a perspective view of a lateral side section according to the present invention.

As shown in FIG. 28, a lateral side section 1 is molded into a required three-dimensional shape of synthetic resin material in the conventional molding cavity. In the drawing, shown are an entrance 51, the upper peripheral edge 52 of a lateral side section 1 and the front peripheral edge 53 of said upper peripheral edge. A thin bottom sheet may be mounted extending over the lower peripheral edge of the lateral side section. The lateral side section is integrally molded of foamy resin compound such as polyurethan resin compound in a molding cavity. The lateral side section comprises a foamed inner layer and a non-foamed outer layer thoroughly surrounding said inner layer, the boundary of the two layers are visible or invisible. Further, the lateral side section has such a construction in section thereof that the mean diameter of bubbles are gradually growing larger from the surface to the center.

The examples of molding method according to the present invention are set forth below.

EXAMPLE 3

100 parts of isocyanate (under the trade name of Shoeprene 30C manufactured by Mitsui Tohatsu Co., Ltd) and 35 parts of polyol (under the trade name of Shoeprene 10P of Mitsui Tohatsu Co., Ltd) are mixed and further pigment and others are added thereto according to necessity. The mixture is injected into a metallic mold at a temperature of 40°–50° C. 6–7 minutes after the injection the resinous material is completely hardened, and then taken out from the mold.

EXAMPLE 4

100 parts of vinyl chloride, 80 parts of plasticizer (O.O.P.), 3 parts of stabilizer (under the trade name of OF-14 by Adecaages Co., Ltd) and 0.5 parts of foaming agent (azodicarbonamido) are mixed and injected into a metallic mold. In this case, some additive is added according to necessity. The metallic mold is at a temperature of about 35° C, while the melting point of the mixture is about 185° C. This molding is injection molding. Then, molded lateral side section of upper is taken out of the mold.

As shown in FIG. 29, a sole 39 may be molded integrally with a lateral side section 1' in a molding cavity. However, a separately formed sole may be connected to a lateral side section by method or other known method. Preferably, a sole comprises a foamed inner layer and a non-foamed outer layer thoroughly surrounding said inner layer, the boundary between the two layers being visible or invisible. The sole has such a construction in section thereof that the mean diameter of bubbles is gradually growing larger from the surface toward the center.

In the sole surface, the peripheral edge is being raised all the way, and the shank portion is also being raised, while the toe portion and the heel portion are recessed respectively from said raised portion of the peripheral edge, said recesses being communicated with each other through a generously recessed portion along the shank portion. A thin bottom sheet may be provided, spreading over the lower peripheral edge of the lateral side section 1 during or after molding. Even a lateral side section formed of material other than synthetic resin can be treated similarly according to the present invention. There are cases that such a kind of lateral side section is practically used for a shoe of the present invention.

The connection between a lateral side section of upper and a sole is as follows.

A sole 39 of FIG. 29 is integrally molded of polyurethan resin composition or other suitable foamed resin composition in a molding cavity, and comprises a foamed inner layer 16 and a non-foamed outer layer 17 thoroughly surrounding said inner layer, the boundary openings. The lateral side section 1' may be molded integrally with the sole 39 in the conventional molding cavity or may be connected to the sole 39 in the conventional means, but the detail of such connections are not referred to here.

Further, examples of material for a lateral side section of upper, a sole and an upper vamp section are set forth below.

The main ingredient of a lateral side section is foamed polyurethan resin of expansion rate 2.0, and that of a sole is vinyl chloride resin of expansion rate 1.5, while an upper vamp section is formed of natural or synthetic resin.

Alternatively, the main ingredient of a lateral side section is foamed polyurethan resin of expansion rate 1.5, that of a sole being vinyl chloride resin of expansion rate 1.3 with an upper vamp section formed of natural or synthetic leather.

Further, a lateral side section is formed of foamed vinyl chloride resin, with a sole formed of material including synthetic rubber as the main ingredient and an upper vamp section of woven or non-woven fabric.

Further, a lateral side section is integrally molded of material including soft vinyl chloride resin as the main ingredient and nitorile rubber as plasticizer in a known molding cavity, while a sole is molded of material including semirigid vinyl chloride as the main ingredient, with an upper vamp section formed of natural or synthetic leather. In the sole surface, the peripheral edge is being raised all the way, and the shank portion is also being raised, while the toe portion and the heel portion are recessed respectively from said raised portion of the peripheral edge, said recesses being communicated with each other through a generously recessed portion along the shank portion. A shape-retaining and connecting member is integrally protruded upwardly from the peripheral edge of the sole 39 throughout the peripheral edge.

The lower peripheral edge protruded from a lateral side section 1 is fitted to the inner surface of the shape-retaining and connecting member of the sole 39, so that a number of small openings on the peripheral edge of the lateral side section are disposed in correspondence with small openings of the connecting member respectively. Then the connecting member and the peripheral edge of the lateral side section are seamed or bound together with a thread.

As shown in FIGS. 30 to 33, a new typed shape-retaining and connecting member has such a construction set forth below, and is formed of synthetic resinous material.

EXAMPLE 5

One end of a shape-retaining and connecting member 54 formed of soft polyurethan resin material is integrally connected, by fusion or by the other conventional stitching, adhering or machine sewing, to the front half portion 55 of the peripheral edge of an upper vamp section 56 at the time of molding or at the other time. In this case, the front half portion 55 is being fitted into a channel 57 of a fitting band branch 58 of the member 54. The extended portion 59 of the upper peripheral edge of a lateral side section 1 is fitted into another channel 60 of a band 61 which is substantially upside-down-U-shaped in section of the other end of the member 54, and then fixed to the member 54 with a thread 62 through openings for seaming or binding together, while the opening is also provided on a flange 63 substantially protruded downwardly from the band 61.

On the other hand, a number of openings are provided on a fitting band branch 58 extended integrally from the other lower edge of the fitting band 61. Seaming or binding together is effected with a thread 64, and, if necessary machine-sewing is carried out through the openings or the channel.

As shown particularly in FIG. 30, the rear half 65 of the peripheral edge of the upper vamp section 56 is integrally connected by fusion either at the same time with the molding of the resin material or at the time of a separate molding. The rear edge portion 66 has a channel 67 into which the rear edge 65 of the upper vamp section is being fitted.

The abovementioned soft polyurethan resin material is a mixture of 100 parts by weight of isocyanate (under the trade name of SHOEPRENE 300C by Mitsui Tohatsu Co., Ltd.) and 39 parts by weight of polyol (under the trade name of SHOEPRENE 10P by Mistui Tohatsu Co., Ltd.) and has expansion rate of 2 and strong adhesiveness to the upper vamp section, so that for a connecting edge of weak construction, preliminary reinforcing treatment is not necessary.

EXAMPLE 6

The material of the said shape-retaining and connecting member is soft vinyl chloride resin composition. The composition is a mixture of 100 parts by weight of vinyl chloride resin, 75 parts by weight of placticizer (DOP), 3 parts by weight of stabilizer (under the trade name of OF-14 by Atekaahsas) and 1 part by weight of foaming agent (Azodicarbonamid). The molded product of the composition has expansion rate of 1.8.

When the shape-retaining and connecting member made of vinyl chloride resin composition is molded and fixed to the upper vamp section by means of the conventional injection molding thereof, the fixing (binding) power thereof is not so strong enough as firmly fixing or binding them together, so some stitching or machine sewing through openings and threads are necessary, while channels as shown in FIG. 30 assist the subject binding or connecting in such a way not to need said stitching or machine sewing.

EXAMPLE 7

The construction as shown in FIG. 31 is substantially the same with that as explained in FIG. 30 except the following structure. The fitting band branch 58 is not provided with the channel 57 in FIG. 30 but a stepped portion 68.

EXAMPLE 8

In FIG. 32, the shape-retaining and connecting member 54 molded according to the step as shown in FIG. 30 consists of the fitting band 61, the flange 63 substantially extended downwardly from the one end of the band 61 and the band branch 58 substantially extended horizontally from the other end of the band 61, said band branch 58 having a stepped portion 69 for receiving the front half portion 55 of the section 56 and said flange 63 also having a stepped portion 70 for receiving the extended portion 59 of the upper peripheral edge of the section 1.

EXAMPLE 9

Figure 33:
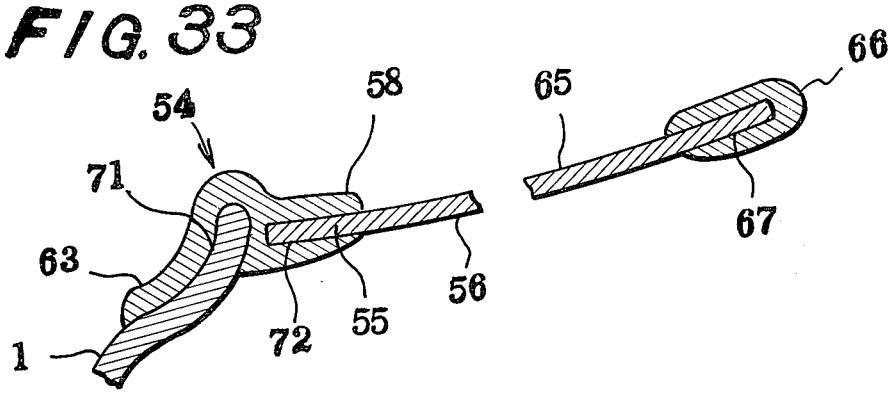
FIG. 33 is a further modification of the shape-retaining and connecting member according to the present invention.

In FIG. 33, the shape-retaining and connecting member 54 consists of the flange 63 and band branch 58, said flange 63 being provided with a channel 71 and said branch 58 being provided with a channel 72. The member 54 is integrally molded with the member 1 and the upper vamp section 56 by means of the method as described in FIG. 30, while it may not be integrally molded with the member 1 and the section 56. That is, the member 54 is molded of the material as heretobefore or hereinafter mentioned and thereafter the member may be connected with the member 1 and section 56 by means of stitching or machine sewing as mentioned heretobefore or hereinafter.

EXAMPLE 10

Figure 34:
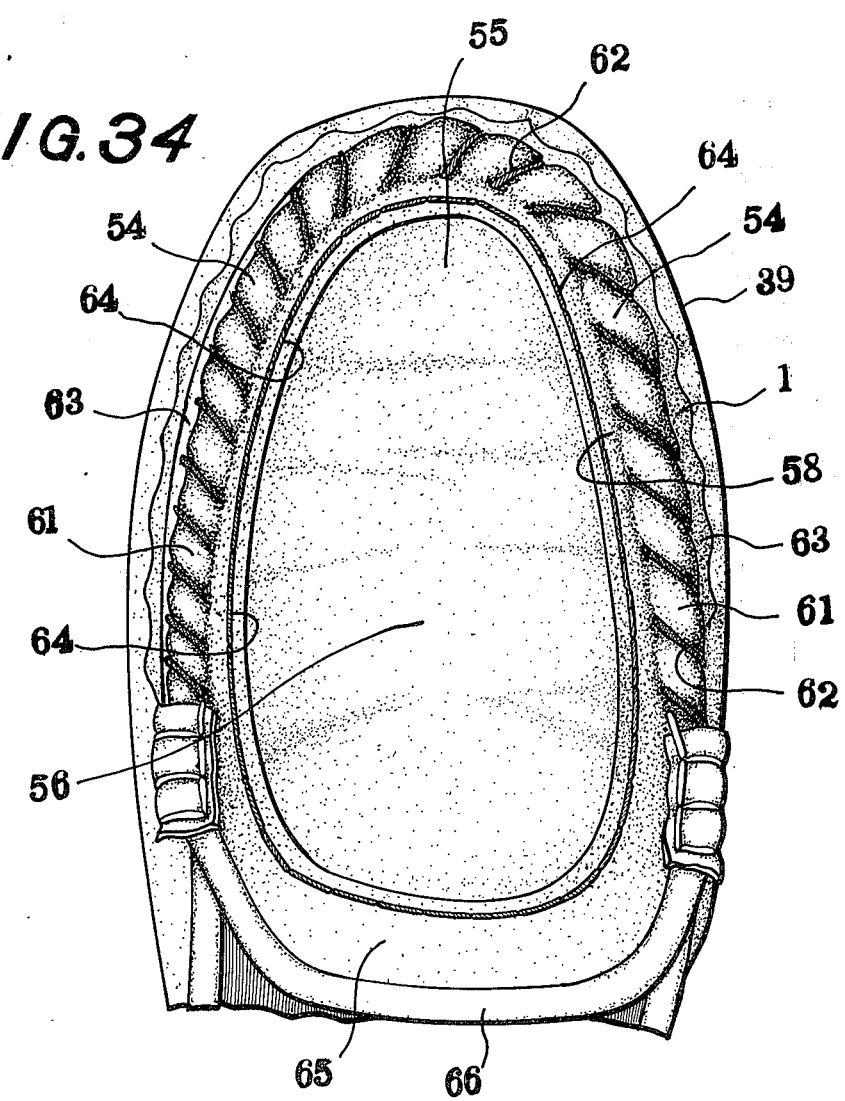
FIG. 34 is a plan view of an upper vamp section according to the present invention.

When the member 54 is molded in the mold according to the method mentioned in FIGS. 30 to 32, the front half portion of the upper vamp section and the upper peripheral edge of the lateral side section are molded integrally with the member 54 by means of the following steps. The front half portion of the upper vamp section and the upper peripheral edge of the lateral side section being protruded, respectively, into the cavity for molding the shape-retaining and connecting member, while the upper vamp section and lateral side section per se being supported by the cavity for supporting, the mold is closed, and then semi-molten material as mentioned in FIG. 30 or heretobefore is injected into the cavity, whereby the shape-retaining and connecting member is mold and bound integrally with the said front half portion of the lateral side section and the upper peripheral edge of the upper vamp section. And if desired, the sole 39 may be molded together with lateral side section, upper vamp section and shape-retaining and connecting member by means of the following step. By using the cavity for molding the shape-retaining and connecting member in such way to integrally bind with the upper peripheral edge of the lateral side section and the front half portion of the upper vamp section which is substantially communicated with the cavity for molding the sole 39, the lower peripheral edge of the lateral side section being protruded into the cavity for molding the sole the lower peripheral edge of the lateral side section is bound integrally with the sole when the sole, the upper vamp section, the lateral side section and the shape-retaining and connecting member are mold together. FIG. 34 is explainning in plain the construction as mentioned in FIG. 30. As explained heretobefore, the lateral side section according to the present invention is to be easily and accurately molded into any required form and shape, and its shape-retaining and durability are quite excellent for many years, preventing from shape-loosing especially in the three-dimensional form, thereby not needing steps for molding and lasting a toe cap section and a counter section, and steps for pulling and lasting for which the most special art and skill were absolutely required for the conventional shoes. This means according to the present invention for any makers to facilitate to save labor, time and material indispensable for producing shoes. The upper vamp section according to the present invention made of natural or synthetic leather is connected to the lateral side section and sole made of synthetic resinous material whereby designs of the shoe rich in variety thereof can be easily presented. The lateral side section 1 may be formed by the following steps.

The conventional needle-punching step is applied to a non-woven fabric and then the punched fabric is dipped into a bath of soft polyurethan solution. Thereafter the fabric thus treated is introduced into the conventional mold and is heated therein, whereby a lateral side section provided with a three-dimensional figure is easily obtained. To the method using the said lateral side section the steps as heretobefore or hereinafter mentioned are applicable for producing some different kinds of shoes.

Further, the said shape-retaining and connecting member 54 can effect a three-dimensional formation of the shoe, the lateral side section of which is not three-dimensionally molded. By forcing the extended portion 59 of the upper peripheral edge of the lateral side section 1 which is not three-dimensionally molded into the channel 60 of the fitting band 61 of the member 54 along the inner surface of the flange 63, and also forcing the front half section 57 of the fitting band branch 58 of the upper vamp section 56 which is not three-dimensionally molded into the channel 57 of the fitting band branch 58 of the member 54, further by firmly binding the lateral side section, the upper vamp section and the shape-retaining and connecting member 54 together by means of molding them within the conventional cavity and/or stitching or machine-sewing (e.g. through thread or string in openings), the lateral side section and the upper vamp section is to be three-dimensionally formed as parts of the shoe provided with the three-dimensional figure. And the counter section of the lateral side section may be three-dimensionally formed by using the construction wherein another shape-retaining and connecting member 18 as shown in FIG. 11.

The main object of the present invention how to produce the three-dimensional lateral side section has been described in detail heretobefore as well as the construction of the lateral side section, together with other objects.

An extra object of the present invention is to present a method for producing an upper including or not including an upper vamp section and the upper produced thereby.

The subject method comprises a step for molding a shape-retaining and connecting member from a thermoplastic or thermosetting resinous material and further step for connecting upper sections of the upper by said connecting member separately or at the same time with the step for molding the connecting member. The connecting member may be protruded integrally from the sole. Meanwhile the upper and a sole may be connected to each other by adhesive agent, sewing-machine stitching or both of them.

In the production of the conventional shoes, considerable working hours, toils and in addition a great skill are required for connecting the upper to the sole. Since after long use of shoes and after hard exercise, the upper is apt to become disconnected from the sole, an upper is to be carefully connected to a sole by a considerably skilled man. Particularly, in connecting an upper to a sole, much care is to be taken to form the upper into a predetermined shape. This is because if the upper mounted on the sole is not predeterminedly shaped, the shoes are uncomfortable to wear and inconvenient to use, to say nothing of bad appearance thereof. Further, it is necessary to prevent the upper from shape-loosing in use, because a shoe with a shape-lost upper is uncomfortable to wear. Further, footwears, especially in the upper thereof have various requirements, but in short, they are not available unless the abovementioned requirements are fulfilled.

According to the present invention, a shoe is to be provided rapidly and easily at low cost without need of skill. Therefore, in said shoe of the present invention, by means of a shape-retaining and connecting member mainly molded of thermoplastic or thermosetting material, the upper is mounted on the sole, and also by means of said member upper sections are connected to one another to form the upper.

Referring to FIGS. 35 to 37, a shoe 100 comprises a sole 101 molded of thermoplastic or thermosetting resinous material (the preferred examples are vinyl chloride resin, polyurethane resin and the like), and having an upper surface smoothly undulated substantially along the profile of the wearer's footsole, and an upper 102 composed of upper sections and a shape-retaining and connecting means for connecting the adjacent sections to one another. The sole 101 comprises a foamed inner layer 103 and a visible or invisible non-foamy outer layer 104 completely surrounding said foamed inner layer from outside, the boundary between the two layers being visible or invisible. Abovementioned compound is formed of, for example, vinyl chloride, plasticizer, vesicant, stabilizer, lubricating material, coloring agent and others. The sole has a construction in its cross-section wherein the average particle diameter of the bubbles is successively growing larger from the surface towards the center throughout the non-foamy outer layer and the foamed layer. The surface of the sole is possessing a shape wherein the peripheral edge portion is being raised all the way, and the shank portion is also being raised, while the toe portion and the heel portion are recessed from said raised portion of the peripheral edge, said recesses of the heel portion and the toe portion are communicated with each other through a generously recessed portion along the shank portion.

The upper comprises the upper sections, that is, a toe cap section, counter section, side vamp sections 105 between the preceding two sections and an upper vamp section 106. These sections are inseparably connected to one another at the adjacent edges thereof by means of a shape-retaining and connecting member 107 integrally protruded from the sole and formed into a band-like shape in the molding step of the sole and having at least a minimum of flexibility and resiliency. The toe cap section and the counter sections are formed integrally with the member 107. In some cases, the connecting member 107, toe cap section and counter section are formed of compounds of vinyl chloride resin, polyurethane resin or other thermoplastic or thermosetting resinous material. The side vamp sections 105 and the upper vamp section 106 are formed of more or less air-permeable natural or synthetic fibre (including fablics thereof) and non-woven fablic, or other materials. They may be formed of natural or synthetic leather, or porous sheet or leather, and in some cases, formed of air-permeable synthetic resin.

However, sections 105, 106 are preferably formed of other materials with a necessary minimum of air-permeability.

As shown in FIGS. 38 and 39, the member 107 is formed of, of course, the same material with the sole. As understood from the molding step to be hereinafter presented, the member 107 is molded substantially in I-shape in section thereof, and the same molten resinous material as used for the member 107 flows into a number of openings provided in the side vamp sections 105, and similarly into a number of openings 108 in the side vamp sections 105 or the upper vamp section 106, whereby adjacent sections, for example, the side vamp sections and the upper vamp section are inseparably connected by means of the member 107. However, if the side vamp sections or the upper vamp section are formed of fibre material or others, in which molten resinous material easily flows into the meshes or eyelets of the texture, abovementioned openings 108 need not be provided. Further, as shown in FIGS. 40, 41 the toe cap section and/or counter section are formed of vinyl chloride, polyurethane or other synthetic resins, the member 107 is formed integrally with said toe cap sections, and in some cases, as shown in FIG. 40 or FIG. 41, the connection is performed in such a manner as the edge portions of the side vamp sections are fitted into the groove of the member 107. The member 107 may have different constructions, for example, as shown in FIGS. 40, 41.

The molding process is now described with reference to FIGS. 36 and 37. A mold 109 has a cavity 110 therewithin, said cavity 110 including a sole-forming chamber 111, a shape-retaining and connecting member-forming chamber 112, and spaces 113 for closely inserting the upper sections thereinto. The sole-forming chamber 111 and the member-forming chamber 112 are communicated to each other to allow the flow of thermoplastic material applied into the cavity 110 through a duct. A lower mold section is supported to move towards up and down by plungers which are actuated by suitable mechanical means (not shown), and a core mold section also is removably supported by the conventional suitable means (not shown). The upper sections of a shoe, that is, the side vamp sections 105 and the upper vamp section 106 are positioned in the spaces 113 for closely inserting the upper sections. In this case, the size of each upper section is so defined that when each of them is positioned in the appropriate space the adjacent edges and/or edges adjacent to the sole are protruded into the shape-retaining and connecting member forming chamber 112 and/or the sole-forming chamber 111. After positioning the upper sections and then closing the mold by injection molding process, vinyl chloride resin compound is injected from an injection molding apparatus (not shown) into the cavity 110 through the duct. The molten synthetic resin material thus injected into the cavity 110 is cooled and cured, and then the upper, which is formed by integrally connecting the upper sections to one another by means of the molded connecting member, and the sole are also integrally connected to each other by means of the connecting means, whereby a shoe of the present invention can be obtained. The connecting means and each of the upper sections may be connected together by machine-sewing stitching after welding.

The construction of the foamed inner layer and non-foamy outer layer of the sole also can be obtained in abovementioned molding step, and such molding is performed according to the conventional and disclosed art.

In the abovementioned molding, in case that a toe cap section, counter sections and side vamp sections are formed of vinyl chloride, polyurethane and other resinous material, only the upper vamp section is positioned into the space for inserting upper sections, and molten resin is injected into the cavity, whereby the toe cap section, side vamp sections, the counter sections, the sole and the connecting member are integrally formed, and at the same time, the upper vamp section are formed integral therewith.

A half boot 114 shown in FIG. 43 has a similar construction to the shoes shown in FIGS. 35 to 41. Said half boot 114 comprises a sole 101 of the same construction with the abovementioned sole, the upper sections 115 and 116 forming the upper and having the same construction with the abovementioned upper sections and a shape-retaining and connecting member 117 having the same construction with the abovementioned member 107. The concrete construction of half boot 114 and molding process thereof are the same as abovementioned.

FIG. 42 shows a shoe, the connecting member 107 of which is provided with another structure with thread 118.

According to the present invention, by means of the shape-retaining and connecting member integrally protruded from the sole in molding step, the upper sections are inseparably connected to each other, and further, the upper thus formed is also inseparably connected to the sole by means of such connecting member, so that even unskilled laborer can rapidly, easily and accurately obtain the predetermined shoes or other footwears by molding and inseparably connecting the sole, the upper sections or the upper to each other by means of such connecting member.

The sole, the upper sections and the upper thus surely connected are not disconnected from each other even after long use, and therefore, footwears of the present invention are excellent in durability.

Since the shape-retaining and connecting member is integrally protruded from the sole, it can be easily and surely formed in such a curved shape corresponding to the required shape of the upper. And the upper is formed by connecting the adjacent upper sections by means of said connecting member in such a curved shape, so that the upper can be easily and accurately formed in a required solid shape by an ordinary and unskilled laborer. The upper thus formed in the required shape well fits the wearer's instep, thus affording the shoe to be comfortable to wear and reducing the fatigue of foot in long use. Further, the upper of the present invention is not apt to lose shape after long use. Since said shape-retaining and connecting member is integrally extended from the sole and has at least a minimum of flexibility or resiliency, when the sole is deformed at the pressure applied in use the shape-retaining and connecting member or the upper is deformed rapidly and surely in correspondence with said deformation of the upper, and after the pressure is gone, the shape-retaining and connecting member will function well enough to compulsorily restore the original shape of the upper. If, in spite of the deformation of the sole, the upper does not change in formation in correspondence therewith, the result is the sprain of the wearer's foot in the worst case, or other disadvantages such as uncomfortableness to wear and increase of the fatigue of the foot. However, as abovementioned, the upper of the present invention changes the form well in correspondence with the deformation of the sole, thereby the shoe being comfortable to wear. Further, since the original shape of the upper is restored by the function of the connecting member, the upper is always retained in the required shape except when pressure is being applied, that is, the shoe is excellent in shape-retaining of the upper, so that according to the present invention easily obtained is a shoe being comfortable to wear and reducing the fatigue of the wear's foot.

Further, according to the present invention, a shoe provided with a sole, a connecting member and upper sections or an upper is obtained in one operation in a mold, thereby affording provision of a low-cost shoe. A toe cap section and counter sections are difficult to be formed of air-permeable materials owing to its original purpose of reinforcement. On the contrary, it is not necessary to form an upper vamp section and side vamp sections of such reinforcing material. It is natural from the original purpose that in an informal shoe and a sport shoe, the foot should be released and reluxed from the pressure by the toe cap section and counter sections both formed of rather rigid material for reinforcement. In this respect, a shoe of the present invention provided with an upper vamp section and side vamp sections formed of an air-permeable and rather soft material, has air permeable effect in side vamp sections and an upper vamp section, and fatigue-reducing effect, with maintaining the reinforcing effect in a toe cap section and counter sections.

Further, according to the present invention, easily obtained are shoes wherein the construction and the formation of upper sections are varied in accordance with the purpose thereof, for example, for an informal shoe or a sport shoe. For example, in a shoe, a toe cap section and counter sections requiring reinforcing effect are formed of natural or synthetic leather, while side vamp sections and an upper vamp section are formed of air-permeable synthetic resin sheet or leather.

It is also possible that an upper and a sole are formed separately, and then the lower peripheral edge of the upper is connected to the sole as shown in FIG. 44. In this case, an upper 119 comprising a toe cap section, counter sections, side vamp sections 120 and an upper vamp section 121 is formed by means of a shape-retaining and connecting member 122 in one operation in the mold in such a manner as shown in FIGS. 36 and 37. Said mold is not provided with a sole-forming chamber. The connection of the upper sections is the same as shown in FIGS. 38 to 42. The upper 119 may be formed into a flat shape, but in this case, it should be so molded as to become solid when mounted on the sole 123. The sole 123 shown in FIG. 44 is formed of a resin compound of a thermoplastic or thermosetting resinous material such as vinyl chloride, polyurethane or others. Said compound is formed, for example, of vinyl chloride, plasticizer, vesicant, stabilizer, lubricating material, coloring agent and others. An example of the molding of a sole using the abovementioned compound was disclosed in the U.S. Pat. No. 3,058,161.

The sole 123 has a surface of a generously undulated shape substantially in conformity with the profile of the user's footsole, and comprises a foamed inner layer 124 and a visible or invisible non-foamy outer layer 125 completely surrounding said inner layer 124 from outside, the boundary between the two layers is visible or invisible. The sole 123 has such a construction in its cross-section as the average particle diameter of the bubbles is successively growing larger from the surface toward the center throughout the non-foamed outer layer 125 and the foamed inner layer 124. In said sole surface, the peripheral edge is being raised all the way, and the shank portion is also being raised, while the toe portion and the heel portion are recessed respectively from said raised portion of the peripheral edge, said recesses of the toe portion and the heel portion are communicated with each other through a generously recessed portion along the shank portion. As shown in FIG. 45, another shape-retaining and connecting member 126 is protruded upwardly and integrally from the required portion of the edge of the sole 123 in the molding step. Said connecting member 126 is provided with a number of pits 127 for stitching. Said connecting member 126 may not have the abovementioned construction but may be formed to be hollow by blow molding, extrusion molding, injection molding or their combinations.

A footwear shown in FIGS. 44, 45 is lightweight, nicely resilient and thereby comfortable to wear because of a formed inner layer of the sole, and in addition, shape-loosing of the sole caused by the inner construction thereof is prevented by the non-foamy outer layer.

In connecting the upper 119 on the sole 123, the shape-retaining and connecting member facilitates said connection. Particularly, the lower peripheral edge of the outer surface of the upper 119 is positioned along the inner peripheral surface of the connecting member upwardly protruded from the sole 123, and then the lower peripheral edge of the upper can be rapidly, easily and accurately connected to the connecting member of the sole by means of machine-sewing stitching, an adhesive agent or their combination, in which connection, the upper can be disposed in a correct position in relation to the sole, thereby the required shape of the upper being obtained.

A number of pits 127 for stitching in the connecting member can facilitate and ensure the machine-sewing connection between the connecting member and the lower peripheral edge of the upper through a thread 128.

A shoe after long use is apt to be deformed especially in the upper thereof. However, said upwardly protruded shape-retaining and connecting member performs shape-retaining effect, thereby the upper of the present invention being surely maintained in a required shape. Since the lower peripheral edge portion of the upper is mounted on the sole by means of the shape-retaining and connecting member, the edge portion of the upper can be cut away or reduced by the area corresponding to that of the connecting member, thereby saving the material of the upper. As the upper sections are inseparably connected to each other by means of the shape-retaining and connecting member 122, the upper 119 can be easily, rapidly and accurately obtained from the upper sections, and in addition, the required solid shape of the upper is easily obtained, and the upper shape thus obtained can be well retained.

Referring now to FIGS. 46 to 50, another embodiment is shown. The sole 129 and the lateral side section 130 of the upper are integrally formed as belowmentioned. The lateral side section 130 is here intended to include whole upper sections except an upper vamp section. The sole 129 and the lateral side section 130 are integrally molded of resin compound including vinyl chloride, polyurethane or other synthetic resin for its main ingredient and in addition other known ingredients by injection molding or other suitable molding. Inside the sole is a foamed layer 131 and outside thereof is a non-foamed layer 132 completely surrounding said foamed layer, the boundary between said two layers being visible or invisible. The sole 129 has such a construction in its cross-section as the average particle diameter of the bubbles is successively growing larger from the surface towards the center throughout the non-foamy outer layer and the foamed inner layer. In the sole surface, the peripheral edge is being raised all the way, and the shank portion is being also raised, while the toe portion and the heel portion are recessed respectively from said raised portion of the peripheral edge, said recesses of the toe portion and the heel portion are communicated with each other through the portion generously recessed along the shank portion. In the drawing, numeral 133 indicates a shape-retaining and decorative member. The lateral side section 130 can be varied in construction according to the thickness, foamed condition, foam-resisting condition or other conditions. Said lateral side section 130 may be formed of a foamed inner layer and a non-foamed outer layer, but in some cases, the inner portion is not in a foamed condition visibly or invisibly. The shape-retaining and connecting member 134 is integrally protruded from the peripheral edge of the lateral side section 130 of the upper along the upper vamp section.

On the other hand, the upper vamp section 135 is formed of leather, cloth or sheet of natural or synthetic fibre material (including fabric), natural or synthetic leather or other materials. Said upper vamp section 135 may be more or less air-permeable or not. The peripheral edge of the upper vamp section 135 along the lateral side section of the upper, or the portion extended from said peripheral edge is connected to the lateral side section 130 by means of the shape-retaining and connecting section 134, which connection is performed in such a manner as shown in FIG. 49, or by other means. Numeral 136 indicates stitching thread for connection.

FIG. 50 shows the portion of the lateral side section 130 of the upper upwardly adjacent to the extended portion of the upper vamp section, wherein a resilient shape-retaining band 137 formed of natural or synthetic rubber or other materials is provided in a bridge-like condition between a pair of portions of lateral side section 130, said shape-retaining band 137 having the effects of retaining the shape of the lateral side section, and in addition fitting the lateral side section on the wearer's instep. Numeral 138 indicates an edge tape of an extrance while numeral 139 indicates an edge tape of te upper vamp section.

According to the present invention, since the sole and the lateral side section of the upper are, as above-mentioned, integrally molded, shoes without the upper vamp section can be produced in a large scale.

The invented shoe, although is possible to be manufactured by mass production, is given varieties thereupon since separately formed upper vamp section is attached to the lateral side section, and thereby at least the upper vamp section is changeable in design against the lateral side section to which it is to be attached.

Particularly, said upper vamp section is connected to the lateral side section by means of the shape-retaining and connecting member 134, so that said connection is easily, rapidly, and surely achieved, and the shape of the upper vamp section after attached, that is, the required shape thereof is well retained. By making air-permeable the vamp section which is formed separately from the lateral side sections, the shoes can be made more comfortable to wear.

Figure 46:
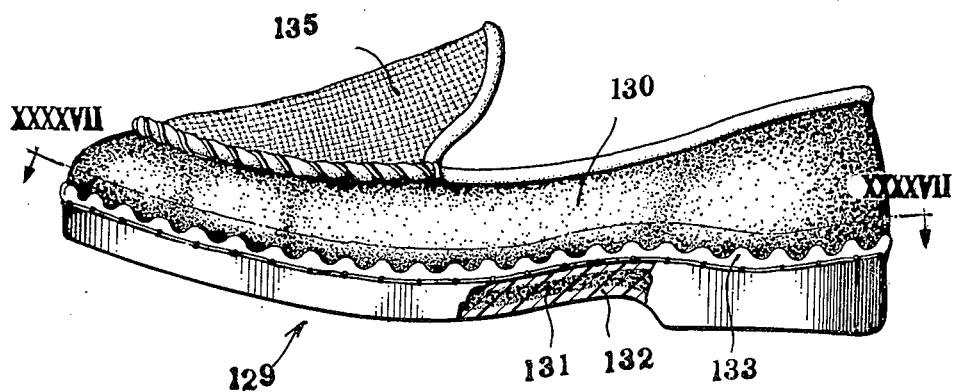
FIG. 46 is a front view of a further modification of the shoe according to the present invention.
Figure 47:
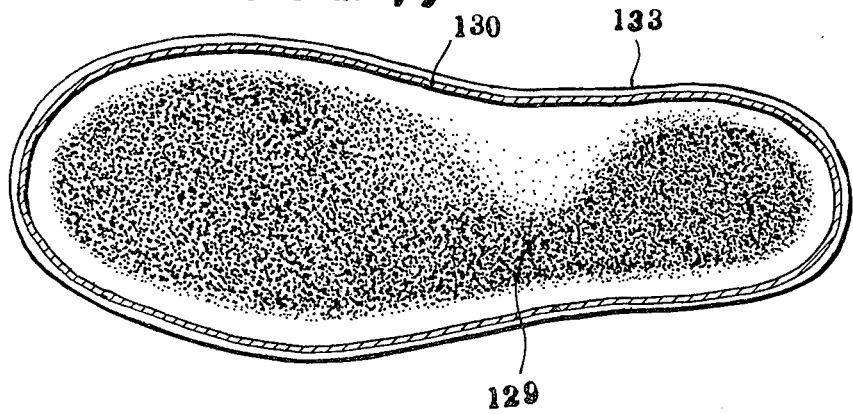
FIG. 47 is a sectional view taken along the line XXXXVII—XXXXVII of the shoe of FIG. 46.
Figure 51:
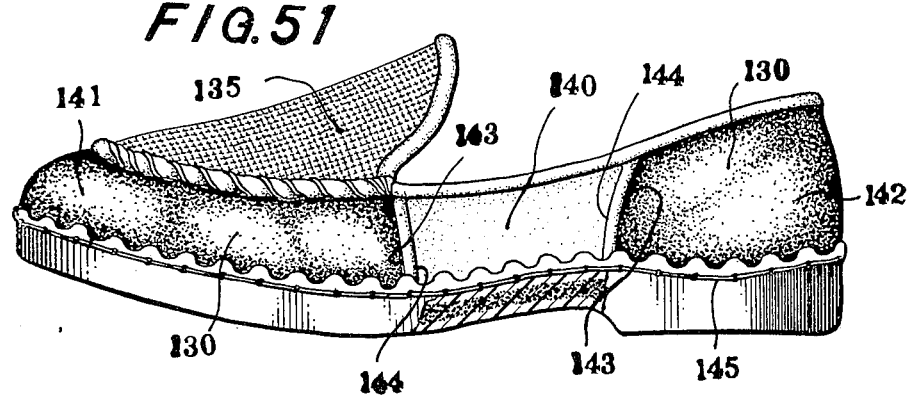
FIG. 51 is a front view of another modification of the shoe according to the present invention, wherein an intermediate section has not attached yet.

In FIG. 51 shown is another embodiment, of which construction is the same as shown in FIGS. 46 and 47 with the following exceptions. The lateral side section 130 is not integrally formed, but is provided with a cut-away portions 140 between the toe cap portion 141 and the counter portion 142. Shape-retaining and connecting members 143, 143 are provided at the edges of the lateral side section 130 adjacent to said cut-away portion 140 respectively. Said connecting members 143, 143 are, together with an edge tape 144, integrally molded with the lateral side section 130 when said lateral side section and the sole are integrally molded. Each of said connecting members 143, 143 has such a construction as shown in any one of FIGS. 53 and 54. Numeral 145 indicates thread for machine-sewing.

Figure 52:
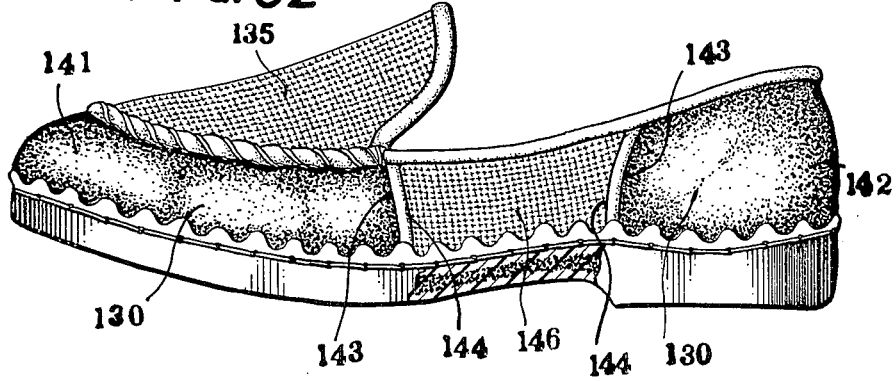
FIG. 52 is a front view of the shoe with the intermediate section being attached.
Figure 52A:
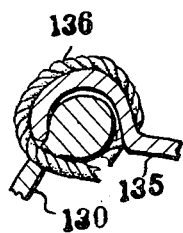

Referring to FIG. 52, shown is a further embodiment, wherein provided is intermediate sections 146 formed of leather, cloth or sheet of natural or synthetic fibre (including fablic), natural or synthetic leather material, vinyl chloride, polyurethane or other synthetic resin material or other materials. As shown in FIGS. 53, 54, the edges of said intermediate sections 146 adjacent to the toe cap section and the counter section respectively are fitted into the grooves of the connecting members 144, 144, and if necessary, stitched up by machine-sewing with thread 145. In FIGS. 55 and 56 are shown the modifications of the connections of FIGS. 53 and 54. The connecting members 144, 144 or 139 the edge tape are integrally formed with the lateral side section 130 as abovementioned, but in some cases they are separately formed of natural or synthetic leather material, natural or synthetic fibre (including fablic thereof), or other suitable materials. The molding of the lateral side section 130 is as set forth below.

The intermediate sections are temporarily secured to or mounted on the inside of the mold within the conventional molding chamber. Molten resin is injected into the sole-forming chamber and the lateral side section-forming chamber, whereby the sole and the lateral side section are integrally molded, and at the same time edges of the intermediate sections 146 which are temporarily secured or mounted in the positions in conformity with the cut-away portion 140 in the upper are, through or not through the fitting grooves, welded to the toe cap section or the counter section which is molded in their position of the upper. In some cases, the upper vamp section 135 is, similarly to the intermediate sections, temporarily secured or mounted inside the mold in the molding chamber, and welded to the toe cap section 141 of the upper.

The invented shoes of the abovementioned construction have the following effects in addition to the effects belonging to the embodiment shown in FIGS. 46 to 50. First, an air-permeable effect is given to the lateral side section of the upper by making the intermediate sections air-permeable. Further, the intermediate sections give the wearer's foot relaxation from the pressure by the reinforcing toe cap section and counter section, thereby the shoes being more comfortable to wear.

Referring now to FIG. 57, the sole 147 is molded of a resin compound consisting of vinyl chloride, polyurethane, or other thermoplastic or other suitable synthetic resin material for its main ingredient and various known additions mixed therewith. The sole 147 is substantially in conformity with the profile of the wearer's footsole. An example of such soles is shown in FIG. 46. Said sole 147 has a foamed inner layer and an non-foamed outer layer both being the same with those of the sole shown in FIGS. 46 to 48. when the sole 147 is molded, a shape-retaining and connecting member 148 is formed in an upwardly protruding shape from the peripheral edge of the sole. The shape-retaining and connecting member 148 has a number of pits 149 for stitching. And the connecting member 148 may have a foamed inner layer and a non-foamy layer similarly to the sole, or may not have such a foamed layer. The lateral side section 150 of the upper has the same construction with that of the upper shown in FIGS. 46 and 47, and provided with an upper vamp section 151. The lower edge of the lateral side section 150 of the upper is disposed along the inside edge of the connecting member 148, and is then connected to the latter by stitching with thread 152 through the pits 149. In some cases, an adhesive agent is used in said connection. And further, the lower edge of the lateral side section of the upper may be welded to the connecting member 148. Thus, the upper is connected to the sole 147.

Figure 58:
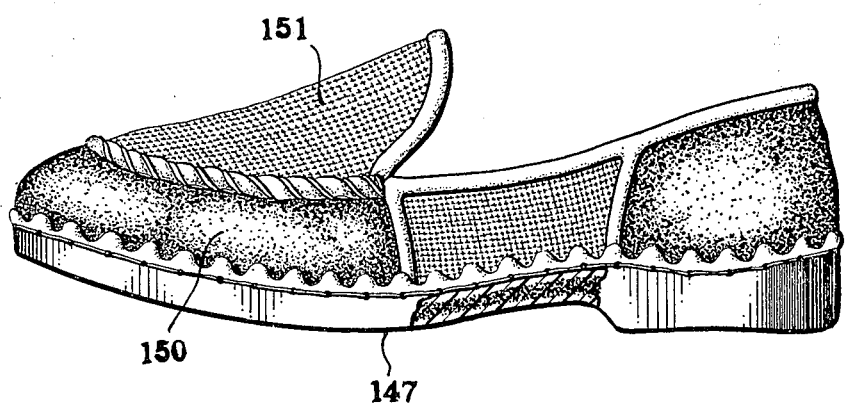
FIG. 58 is a front view of a further modification of the shoe according to the present invention.
Figure 58A:
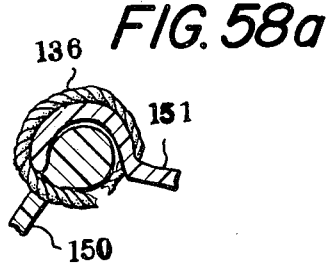

In another shoe shown in FIG. 58, the sole 147 has the same construction with that shown in FIG. 57. The lateral side section 150 of the upper and the upper vamp section 151 may have the same construction with those of FIG. 57, and in such cases, the connection between the lateral side section of the upper and the sole is performed in the same manner as shown in FIG. 22.

Figure 59:
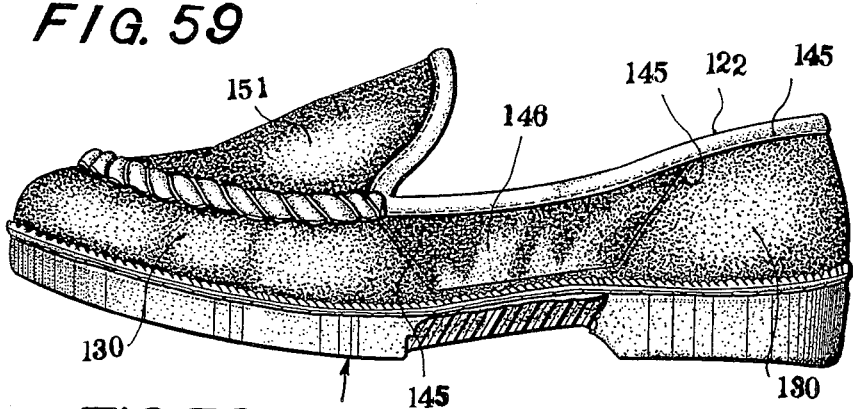
FIG. 59 is a front view of a further modification of a shoe according to the present invention.
Figure 59A:
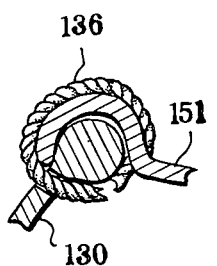
Figure 59B:
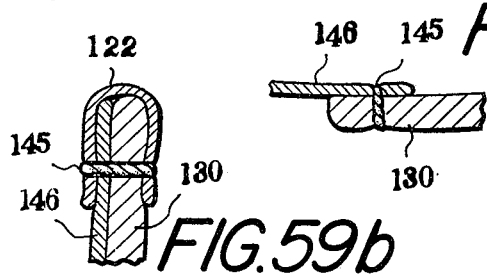
Figure 59C:
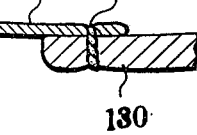
Figure 60:
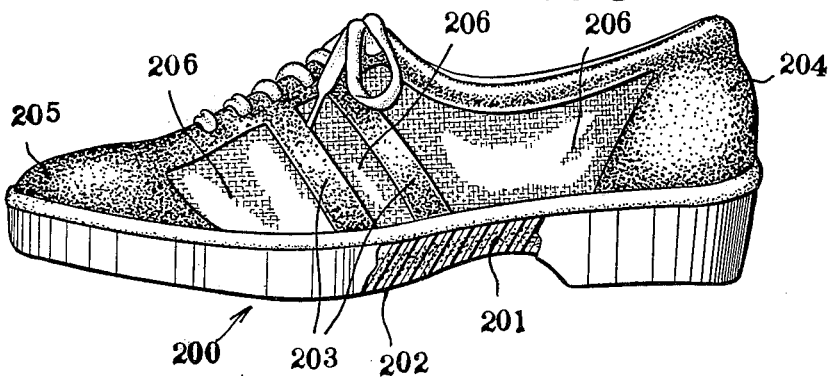
FIG. 60 is a front view of a further modification of a shoe according to the present invention.

In FIG. 59, the construction of the shoe is the same with that in FIG. 52 or 58, except that the intermediate section 146 made of natural or synthetic leather and the lateral side section 130 are inseparably bound by the conventional adhesive agent and hand or machine sewing thread 145 while the tape 222 covers the sections 130, 146 and they are inseparably bound by the thread 145 through or non through the adhesive agent. Referring to FIG. 60, there are shown a sole 200, a foamed layer 201, a non-foamed layer 202, a connecting member 203. Members 205, 204 are formed of the same material with the member 203 and are a toe cap section and a counter section respectively. Numeral 206 indicates an intermediate section formed of air-permeable natural or synthetic fiber, or sheet of natural or synthetic leather. The connecting member 203 may be either protruded integrally from the sole or formed separately therefrom while it may be formed together with the section 204 and/or the section 205. The shoe is manufactured by an appropriate one of the abovementioned methods or modification thereof. The material for said shoe is the same as used in the abovementioned methods or similar materials.

Figure 61:
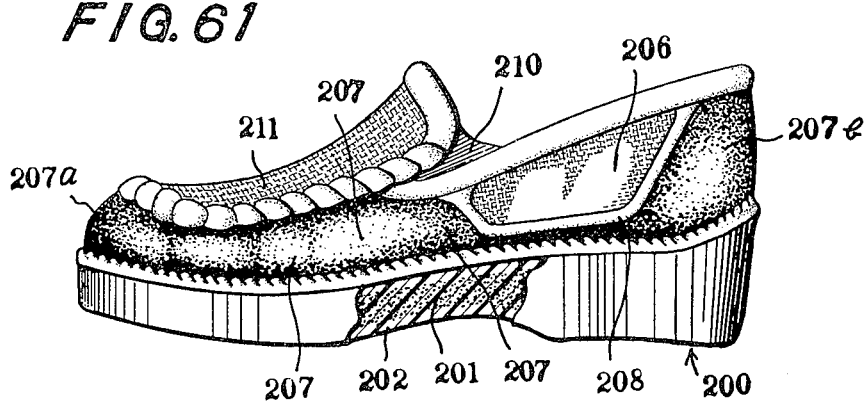
FIG. 61 is a front view of a further modification of a shoe according to the present invention.

Referring to FIG. 61, shown is a further modification of a shoe of the present invention. In the drawing, there are shown a sole 200, a foamed layer 201, a non-foamy layer 202, a connecting member 207, a toe cap section 207a, a counter section 207b, an intermediate section 206 for integrally connecting said toe cap section and said heel portion, a mounting edge 208 for mounting said intermediate section, which edge 208 may be decorated with a tape, an intermediate section 206 formed of air-permeable natural or synthetic fiber, or sheet of natural or synthetic leather, an elastic band 210 and an upper vamp section 211 formed of sheet of air-permeable natural or synthetic fiber or natural or synthetic leather, and said upper vamp section 211 may be connected mainly to the toe cap portion 207a of the connecting member 207 in a known manner, but preferably connected by means of a connecting member formed integral with the toe cap section 207a and/or the section 207b.

This shoe is manufactured by an appropriate one of the methods as described heretobefore or a modification thereof, and material for said shoe is the same as used in said method or modification thereof.

Referring now to FIGS. 62 to 66, some embodiments of the method, apparatus and shoe of the present invention are described below.

The sole 200 is molded of hard vinyl chloride, polyurethan or thermoplastic synthetic rubber in a cavity for the first molding in a metallic mold, and within 10 seconds thereafter, a lateral side section 1 of upper is molded of hard vinyl chloride, polyurethan or thermoplastic synthetic rubber in a cavity for the second molding obtained by modifying of said first cavity whereby the soft sole and the hard lateral side section of upper can be integrally formed.

Further, in said molding, by mounting or temporarily attaching at a required position of said cavity of the mold an upper vamp section 25 or 56 of natural or synthetic leather, or natural or synthetic fiber or the like, said upper vamp section is connected to the lateral side section by making use of fusion of vinyl chloride, polyurethan or synthetic rubber. In case of the upper vamp section of leather or the like, a number of openings 220 are so provided that molten material can penetrate into said openings as shown in FIGS. 38, 57, 59, 30 or 31.

Further, a cover section 221 for covering a cut-away portion 230 of the lateral side section 1 of upper is temporarily attached in the required position of the cavity similarly to said upper vamp section 25 or 56, and connected to the lateral side section by said molding.

| | Composition for sole material | |
|---|---|---|
| hard ethylene-vinylacetate copolymer resin | copolymer resin including 15% of vinylacetate | —100 parts |
| | foaming agent (Azodicarbonazide) | —0.7 part |
| | Composition for upper material | |
| soft ethylene-vinylacetate copolymer resin | copolymer resin including 30% of vinylacetate | —100 parts |
| | foaming agent (Azodicarbonazide) | —0.7 part |

For producing the subject shoe is applied a preferred method and apparatus among the conventional those such as the method and apparatus modified from those as disclosed in U.S. Pat. No. 3,671,621, and methods and apparatus developed by Desma-Werke GmbH in Federal Republic of Germany being famous in offering DESMA 702, DESMA 608+609, DESMA V810, DESMA 703/704 and DESMA 700M.

A sole is molded of the said material together with a lateral side section of upper of the said material under the same step or under the differential steps while the upper per se may be molded together with the sole. An integrated sole and lateral side section formed of two kinds of material is obtained.

As abovementioned, according to the present invention, by a series of operations an integrated sole and lateral side section of upper or a shoe formed of two kinds of material can be economically and successively manufactured, in which the sole portion is formed, e.g., of relatively durable first material while the lateral side section is formed, e.g., of relatively soft second material.

By making some modification of the apparatus as required and providing three or more nozzles, an integrated sole and lateral side section or a shoe formed of three or more kinds of material can be manufactured according to the present invention.

Figure 62:
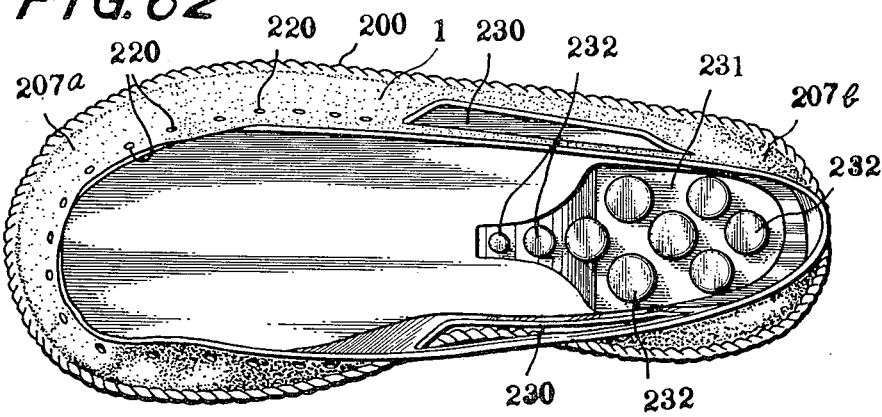
FIG. 62 is a plan view of a sole integrally provided with a lateral side section of upper.
Figure 63:
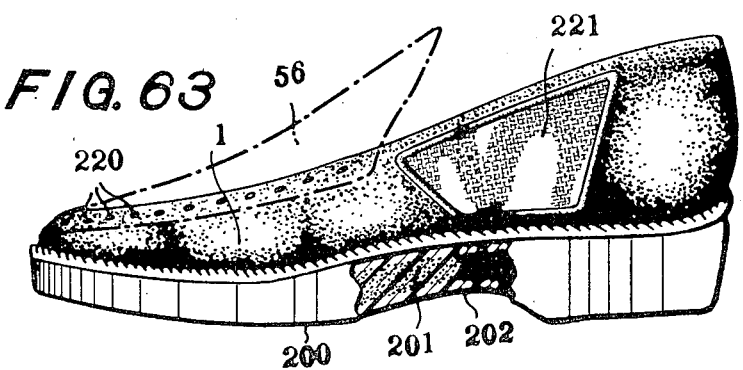
FIG. 63 is a front view of the sole of FIG. 62.
Figure 64:
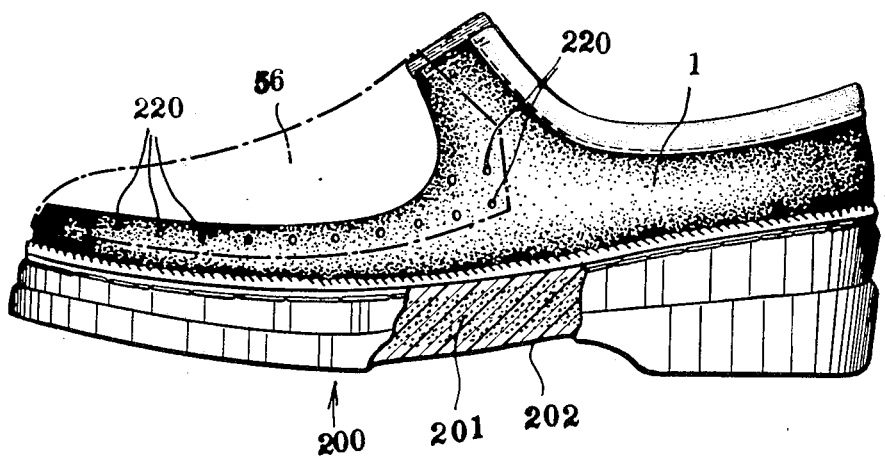
FIG. 64 is a front view of another modification.
Figure 65:
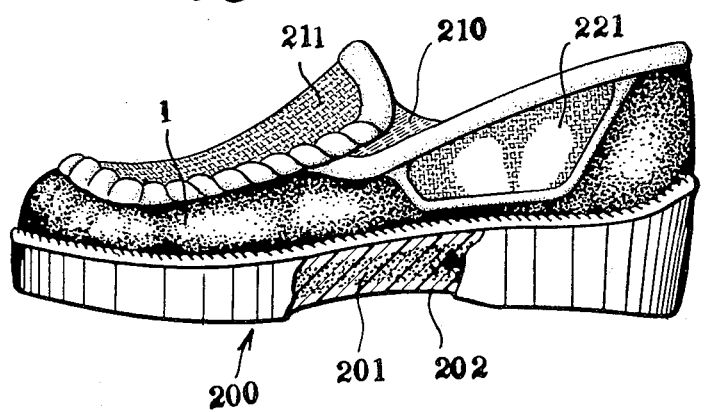
FIG. 65 is a front view of a further modification.

Referring to FIG. 62, shown are recesses 231 and cylindrical cushioning members 232 extending upwardly from said recesses 231.

Figure 66A:
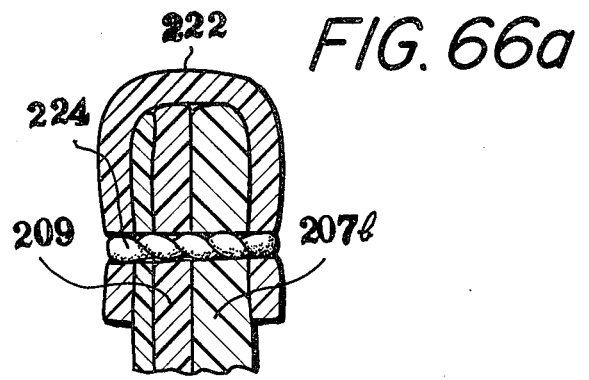
FIG. 66 is a front view of a further modification.
Figure 66:
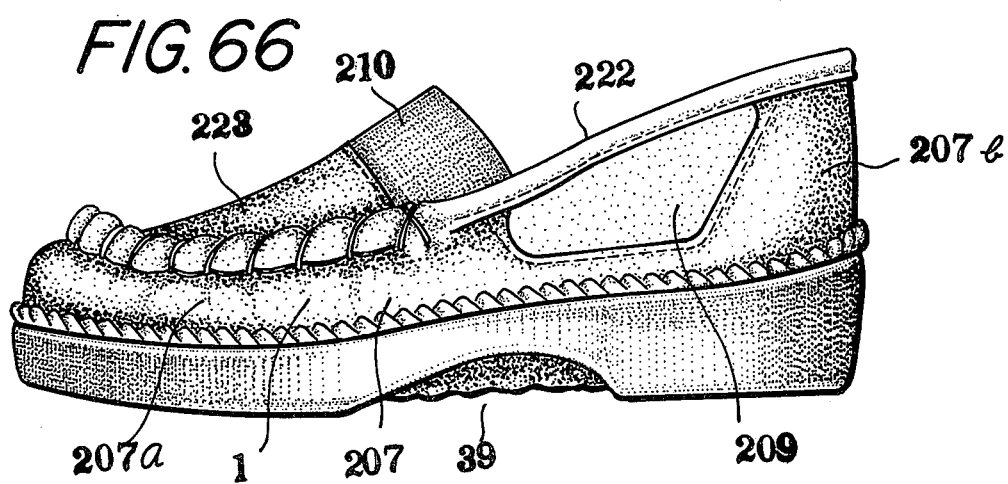
Figure 66B:
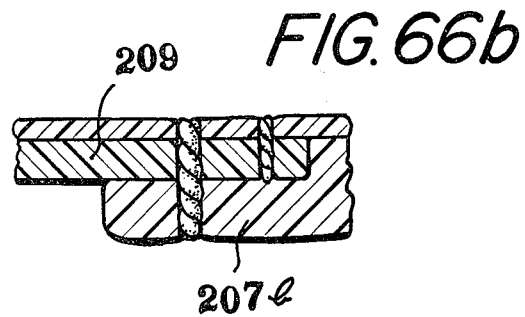

Referring to FIG. 66, the lastic band is provided adjacent to an upper vamp section 223 made of natural or synthetic leather, and the lateral side section 207 and the intermediate section 209, the uppermost edges of which are covered by a peripheral tape 222 are bound by the conventional adhesive agent under assistance of a thread 224.

When molding the lateral side section including or not including the upper vamp section as shown in the preferred drawings among those explained heretobefore, the conventional material for lining or backing may be previously positioned at some place within the cavity of the mold and then material being bound to the inside of the lateral side section at the same time with the subject molding or may be fixed to the inner faces of the lateral side section after the molding. The shape-retaining and connecting member, e.g. 122 as shown in FIG. 44 may include the toe cap section and/or the counter section.

Further, the conventional material for lining or backing the inside of the lateral side section may be adhered to the shape-retaining and connecting member by the conventional adhesive agent previously applied to the material while if necessary the adhered portion of the material and the shape-retaining and connecting member is further bound by the machine sewing or hand sewing.

What I claim is:

1. In a method for integrally manufacturing a shoe of resinous material, the improvement comprising a first step of three-dimensionally molding a lateral side section of plastic resinous material in a molding cavity, a second step of connecting an upper vamp section with said lateral side section, and a third step of connecting a sole with the lateral side section.

* * * * *